US012783748B2

(12) United States Patent
Walia et al.

(10) Patent No.: US 12,783,748 B2
(45) Date of Patent: Nov. 3, 2026

(54) QUANTIFICATION OF EXPRESSIVE EXPERIMENTAL SEMI-VARIOGRAM RANGES UNCERTAINTIES

(71) Applicant: Saudi Arabian Oil Company, Dhahran (SA)

(72) Inventors: Samir Kumar Walia, Dhahran (SA); Sherif Khattab, Dhahran (SA); Marko Maucec, Englewood, CO (US)

(73) Assignee: Saudi Arabian Oil Company, Dhahran (SA)

( * ) Notice: Subject to any disclaimer, the term of this patent is extended or adjusted under 35 U.S.C. 154(b) by 1228 days.

(21) Appl. No.: 17/668,194

(22) Filed: Feb. 9, 2022

(65) Prior Publication Data

US 2023/0252202 A1 Aug. 10, 2023

(51) Int. Cl.
*G06F 30/20* (2020.01)
*E21B 49/00* (2006.01)
*G06F 111/10* (2020.01)

(52) U.S. Cl.
CPC .............. *G06F 30/20* (2020.01); *E21B 49/00* (2013.01); *E21B 2200/20* (2020.05); *G06F 2111/10* (2020.01)

(58) Field of Classification Search
CPC .............................. G06F 30/20; G06F 2111/10
USPC ............................................................ 703/10
See application file for complete search history.

(56) References Cited

U.S. PATENT DOCUMENTS 6,711,404 B1 3/2004 Arpee et al.
7,254,091 B1 * 8/2007 Gunning ................ G01V 11/00 702/14
8,009,170 B2 * 8/2011 Shi .......................... G06F 17/18 345/440

(Continued)

OTHER PUBLICATIONS

Li et al. (Quantifying Contributions of Uncertainties in Physical Parameterization Schemes and Model Parameters to Overall Errors in Noah-MP Dynamic Vegetation Modeling, James Research Article, 2020, pp. 1-23) (Year: 2020).*

(Continued)

*Primary Examiner* — Iftekhar A Khan
(74) *Attorney, Agent, or Firm* — Fish & Richardson P.C.

(57) ABSTRACT

Systems and methods include a computer-implemented method for optimizing variogram ranges uncertainties. Variogram modeling is performed using variogram models on wells in parallel (major), normal (minor), and vertical directions for continuous log porosity to select a best-fit variogram model using large uncertainty ranges and a preferred-normal distribution. A distribution of geological properties is determined onto the best-fit variogram model. Multiple realizations are executed to determine predicted porosities over the best-fit variogram model. Correlation coefficients of actual porosity versus predicted porosity are generated using the multiple realizations. The process is repeated until a correlation meets a predetermined acceptance criteria. A variogram range for the best-fit variogram model is optimized using a high correlation realization. Correlations are determined for the subset of wells by executing multiple realizations using a same seed number. Final optimized variogram ranges uncertainties are determined by repeating the optimizing and determining until an acceptance correlation is achieved.

20 Claims, 21 Drawing Sheets

(56) References Cited

U.S. PATENT DOCUMENTS

| | | | | |
|---|---|---|---|---|
| 8,294,718 | B2 | 10/2012 | Shi et al. | |
| 9,110,193 | B2 * | 8/2015 | Chen | G01V 11/00 |
| 9,201,164 | B2 * | 12/2015 | Thorne | G01V 20/00 |
| 10,895,131 | B2 * | 1/2021 | Mustapha | E21B 41/00 |
| 10,995,592 | B2 * | 5/2021 | Imhof | E21B 41/00 |
| 11,313,993 | B2 * | 4/2022 | Prochnow | E21B 43/00 |
| 2008/0234988 | A1 * | 9/2008 | Chen | G01V 11/00 703/1 |
| 2009/0091573 | A1 * | 4/2009 | Shi | G01V 1/301 345/440 |
| 2010/0121622 | A1 * | 5/2010 | Shi | G06F 17/18 703/2 |
| 2011/0004448 | A1 * | 1/2011 | Hurley | G06T 17/00 702/179 |
| 2011/0205844 | A1 * | 8/2011 | Maucec | G01V 1/00 367/43 |
| 2012/0221306 | A1 * | 8/2012 | Hurley | G01V 20/00 703/6 |
| 2012/0232865 | A1 * | 9/2012 | Maucec | G01V 1/30 703/2 |
| 2012/0290277 | A1 * | 11/2012 | Thorne | G01V 20/00 703/10 |
| 2013/0124092 | A1 * | 5/2013 | Thorne | G01V 99/00 702/6 |
| 2013/0124097 | A1 * | 5/2013 | Thorne | G01V 20/00 702/11 |
| 2013/0158962 | A1 * | 6/2013 | Yarus | G01V 11/00 703/2 |
| 2013/0317779 | A1 * | 11/2013 | Thorne | G01V 11/00 702/180 |
| 2014/0350856 | A1 * | 11/2014 | Lambie | G01W 1/00 702/3 |
| 2016/0090825 | A1 * | 3/2016 | Imhof | E21B 41/00 703/10 |
| 2018/0321421 | A1 * | 11/2018 | Halabe | E21B 41/00 |
| 2019/0391288 | A1 * | 12/2019 | Lin | G01V 1/282 |
| 2020/0124753 | A1 * | 4/2020 | Halsey | G01V 1/306 |
| 2021/0199843 | A1 * | 7/2021 | Rashid | G01V 20/00 |
| 2021/0286097 | A1 * | 9/2021 | Nasser | G01V 1/302 |
| 2022/0291405 | A1 * | 9/2022 | Silveira de Albuquerque Martins | G01V 1/50 |
| 2022/0308256 | A1 * | 9/2022 | Alhawi | E21B 41/00 |

OTHER PUBLICATIONS

Ortiz et al. (Calculation of Uncertainty in the Variogram, Mathematical Geology, vol. 34, No. 2, Feb. 2002, pp. 169-183) (Year: 2002).*

Derakhshan et al., “Impact of Data Spacing on Variogram Uncertainty,” Centre for Computational Geostatistics Department of Civil & Environmental Engineering University of Alberta, 2006, 19 pages.

Ortiz et al., “Calculation of the Uncertainty in the Variogram for More Realistic Reservoir Forecasting,” University of Alberta, 2000, 16 pages.

Pyrcz et al., “Representative Input Parameters for Geostatistical Simulation,” Department of Civil & Environmental Engineering University of Alberta, 2003, 25 pages.

Azevedo et al., “Multi-scale uncertainty quantification in geostatistical seismic inversion,” Cornell University Library, Oct. 2018, 41 pages.

Babak et al., “Accounting for Parameter Uncertainty in Reservoir Uncertainty Assessment: The Conditional Finite-Domain Approach,” Natural Resources Research, Mar. 2009, 18(1):7-17, 11 pages.

Caers et al., “Geostatistical Quantification of Geological Information for a Fluvial-Type North Sea Reservoir,” SPE Reservoir Eval., Oct. 2000, 11 pages.

Ketteb et al., “Modeling of porosity by geostatistical methods,” Arabian Journal of Geosciences, Springer, Apr. 2019, 12 pages.

PCT International Search Report and Written Opinion in International Appln. No. PCT/US2023/012581, dated May 22, 2023, 25 pages.

* cited by examiner

QUANTIFICATION OF EXPRESSIVE EXPERIMENTAL SEMI-VARIOGRAM RANGES UNCERTAINTIES

TECHNICAL FIELD

The present disclosure applies to improving predictions and processes used in completing reservoirs for the petroleum industry.

BACKGROUND

Geostatistical simulation techniques are often used to quantify reservoir uncertainties by generating multiple realizations, where each realization can represent an equiprobable (equally probable) model. Geostatistical simulation algorithms typically do not require various input parameter uncertainty ranges, as the common practice is to use scaler factors for base values in computations of multiple realizations. This practice (e.g., used for more reliable equiprobable models) can defeat the purpose of generating multiple realizations, as uncertainty ranges are not quantified when using representative data.

Variograms can provide a central role in geostatistical simulation methods in which degrees of variability are measured. For example, the variogram value 2γ(h) can be used as a mean-squared difference between two data points separated by a distance h referred to as lag. Variograms can have a direct impact on petrophysical spatial property distribution and may not affect hydrocarbons in place, but may indirectly affect recovery and fluid flow sweep efficiency.

SUMMARY

The present disclosure describes techniques that can be used for measuring and quantifying variogram uncertainties and for generating best fit variograms for forward modeling.

In some implementations, a computer-implemented method includes the following. Variogram modeling is performed using a set of variogram models on a set of wells in parallel (major), normal (minor), and vertical directions for continuous log porosity to select a best-fit variogram model using large uncertainty ranges and a preferred-normal distribution of each variogram model in the set of variogram models. A distribution of geological properties of a subset of the set of wells is determined onto the best-fit variogram model. Multiple realizations are executed on the subset of wells to determine predicted porosities over the best-fit variogram model. Correlation coefficients of actual porosity versus predicted porosity are generated on the subset of wells using the multiple realizations. The performing, determining, executing and generating are repeated until a correlation meets a predetermined acceptance criteria. A variogram range for the best-fit variogram model is optimized using a high correlation realization. Correlations are determined for the subset of wells by executing multiple realizations using a same seed number and the optimized variogram range. Final optimized variogram ranges uncertainties are determined by repeating the optimizing and determining until an acceptance correlation is achieved.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Using the techniques of the present disclosure can improve the reliability of variogram parameter range uncertainties for use in quantifying reservoir uncertainties, as the optimization is based on a prediction process rather than random scaler around mean values. For example, optimization can refer to determining variogram ranges that indicate or result in prediction performance greater than a predefined threshold with respect to using scaler values. This can make it possible to freeze variogram parameter range uncertainties, making it possible to vary other parameter uncertainties to improve history-matching processes. The techniques of the present disclosure can provide improvements over conventional techniques in which variogram uncertainties are scaler by addressing the problem in a more data-driven way, which can lead to better and more reliable reservoir simulation and predictions (e.g., using a clean data driven workflow to quantify variogram ranges uncertainties). Techniques can be used to address stochastic uncertainties quantification caused by variograms to distribute reservoir properties such as porosity and enhance the reservoir simulation quality and predictability. Workflows can be used to identify spatial data point distribution and to validate results while performing reservoir simulation. Variogram parameter uncertainties in multi-realization models can be quantified.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques that can be used for measuring and quantifying variogram uncertainties and for generating best fit variograms for forward modeling. A best fit variogram can be defined as a best-fit line relative to scatter data. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Some approaches can be implemented with respect to a sector model of a carbonate reservoir using vertical wells. A large range uncertainty space of variogram parameters has typically been used to compute multiple realizations. Prediction results of large variogram ranges can be validated through the use of a few blind test wells. High correlation clusters can be used to optimize uncertainty ranges of variogram parameters such as azimuth, normal, and vertical. The final set of multiple realizations can be computed using optimized ranges for sensitivity analysis. For example, optimization can refer to determining variogram ranges that indicate or result in prediction performance greater than a predefined threshold with respect to using scaler values.

A comparison of reservoir simulation results between large and optimized variogram ranges can reflect the smaller statistical spread. This can ultimately provide a tool for limiting the statistical spread in history-matching processes and result in reservoir model realizations that have better predictability.

Three-dimensional (3D) geological modeling is a popular approach in the exploration and production (E&P) industry, often used to build reservoir digital twins based on subsurface measurements and geological concepts. In the E&P industry, it is a common practice to use multiple geostatistical techniques to distribute and predict reservoir properties at unsampled locations. Each geostatistical technique has its own limitations, along with limited data samples. As a result, it is critical to quantify reservoir properties and geostatistical parameter uncertainties to build multiple equiprobable models. Variogram models can serve as the pillar of geostatistical methods to predict reservoir property at the unsampled locations while measuring degrees of variability.

Figure 1:
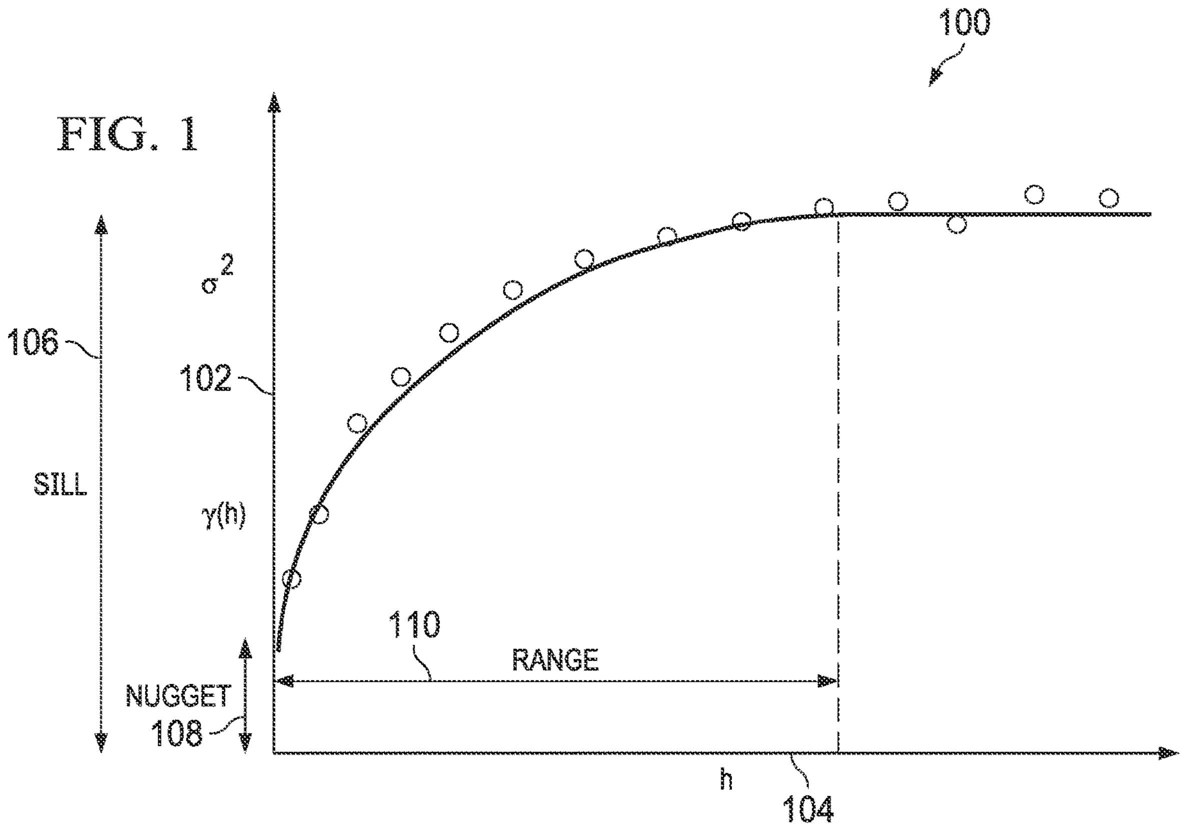
FIG. 1 is a diagram showing example components of a variogram model, according to some implementations of the present disclosure.
Figure 10:
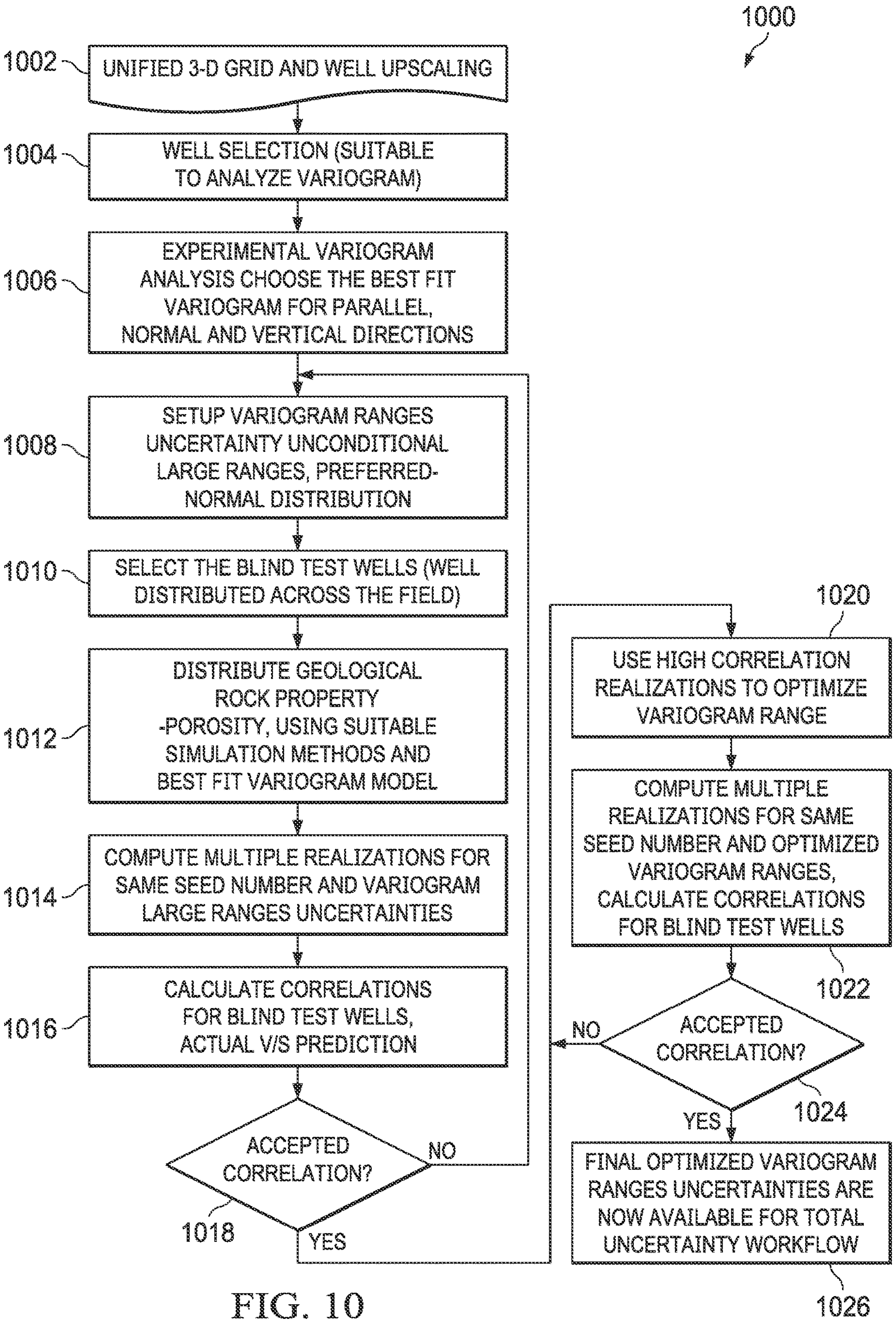
FIG. 10 is a diagram showing an example of a workflow for optimizing uncertainty ranges of variogram parameters, according to some implementations of the present disclosure.

FIG. 1 is a diagram showing example components of a variogram model 100, according to some implementations of the present disclosure. The variogram model 100 can use a variogram value $2\gamma(h)$ 102, which is a mean-squared difference between two data points separated by a distance h (referred to as "lag"), where $\gamma(\ )$ is a function of the separation between the two data points. The variogram model 100 can use, as it mathematical model, multiple components such as type of variogram models (e.g., spherical, Gaussian, and exponentials), sill 106, nugget 108, and variogram range 110. The variogram range 110 is an important factor, defining a distance of a degree of variability. A workflow shown in FIG. 10 demonstrates an example of a methodology for the quantification of variogram ranges uncertainties. FIG. 10 is helpful in providing a workflow for optimizing variogram ranges uncertainties supported by a high correlation between predictions and actual values. This is also helpful in history matching processes to limit the statistical response caused by variogram ranges. This process provides a methodology to quantify variogram range uncertainties for more reliable property prediction at unsampled locations for better reservoir development planning.

A prerequisite for attaining the variogram model 100 can include having, as input, 3D grid and well log data 1002 (e.g., continuous-porosity or discrete-facies) that is upscaled to grid level, with a data transform applied to the continuous log to remove any anisotropy or trends (lateral or vertical). The following steps, associated with FIG. 10, can be used to accomplish the quantification of variogram ranges uncertainties.

FIG. 10 is a diagram showing an example of a workflow 1000 for optimizing uncertainty ranges of variogram parameters, according to some implementations of the present disclosure. As an example, parameters that are optimized by the workflow 1000 can include azimuth (normal, vertical, and parallel direction ranges) to compute multiple geostatistical realizations. Optimized variogram parameter ranges can result in more reliable equiprobable models used for sensitivity analysis.

At 1004, suitable wells are selected for analysis for use in the variograms model. For example, selection can include considering only vertical wells and avoiding using horizontal sections. In an example spanning the steps of workflow 1000, the selection of suitable wells for use in deriving the variogram model can include selecting 40-plus wells that are widely-distributed in a field.

At 1006, variogram modeling is performed for a best fit variogram model in all three directions (including parallel (major), normal (minor), and vertical to the axis) for continuous log porosity. A similar approach can be used for a discrete log such as facies or rock type.

At 1008, variogram uncertainty ranges are set up. In experimentation of techniques associated with the variogram model, a large range of uncertainties was initially assigned for variogram ranges, and other parameters (including sill and type of variogram) were kept the same in all realizations.

Figure 2A:
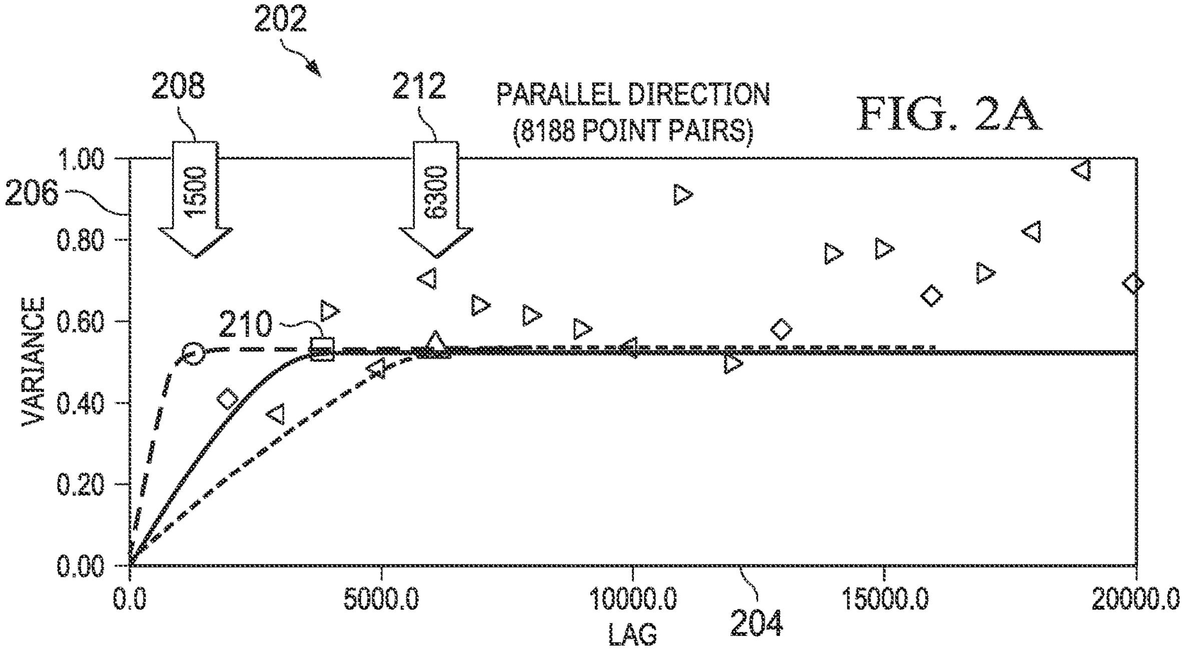
FIGS. 2A-2F are diagrams illustrating examples of graphs showing the best fit variogram model for long ranges and assigned uncertainties values, according to some implementations of the present disclosure.
Figure 2B:
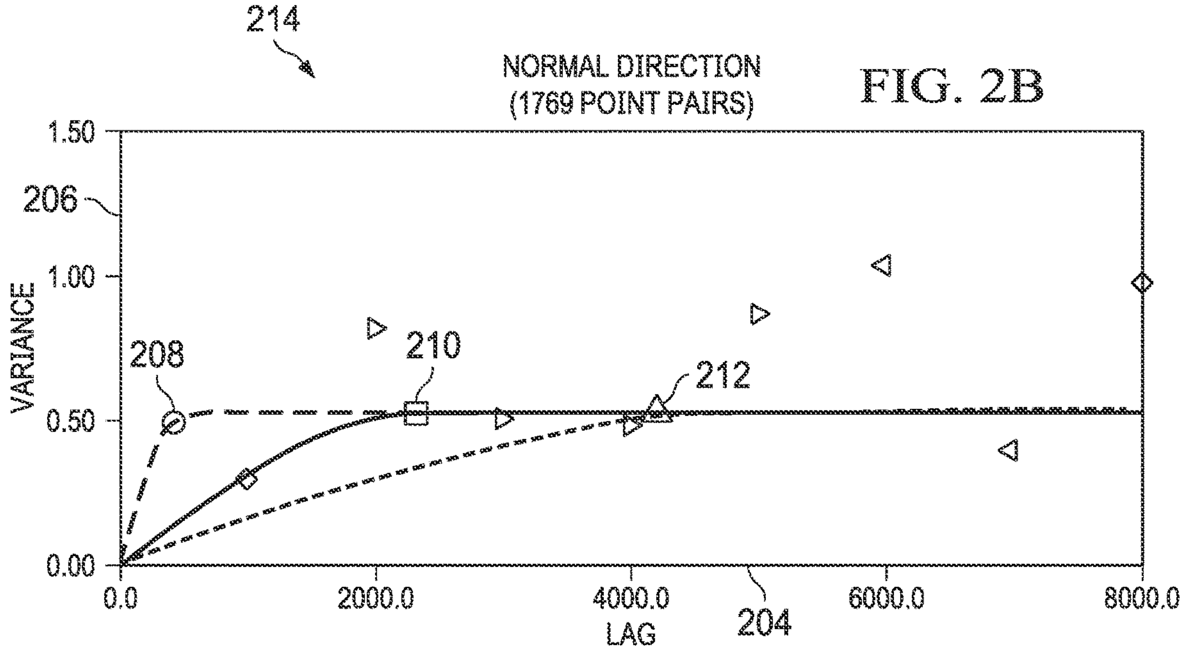
Figure 2C:
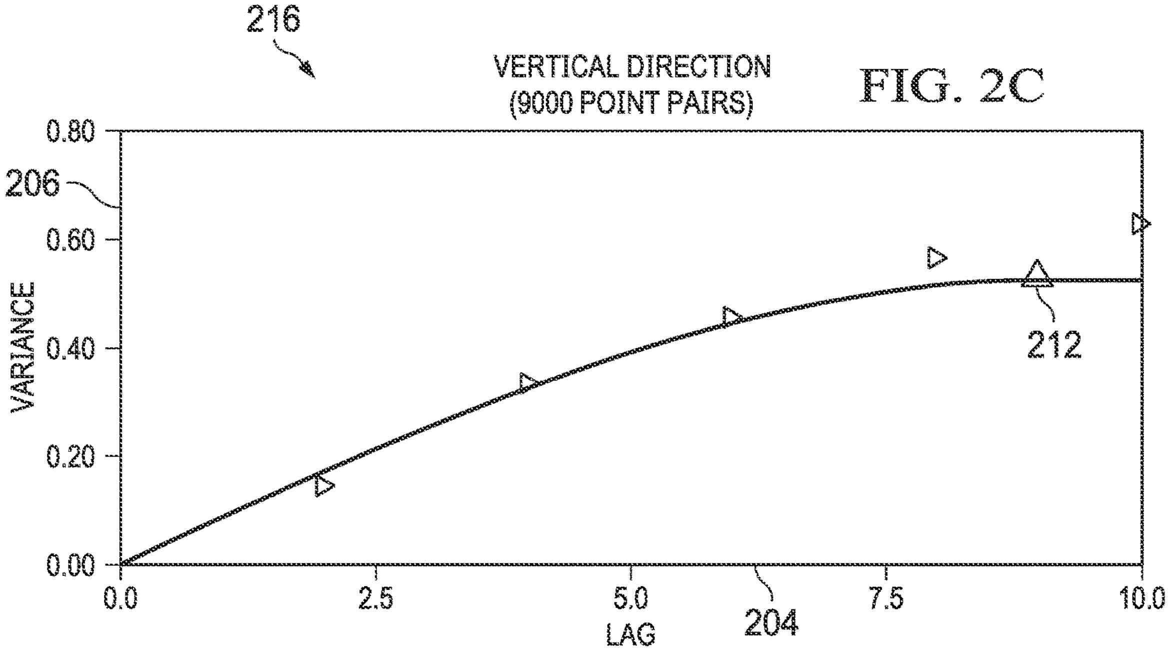
Figure 2D:
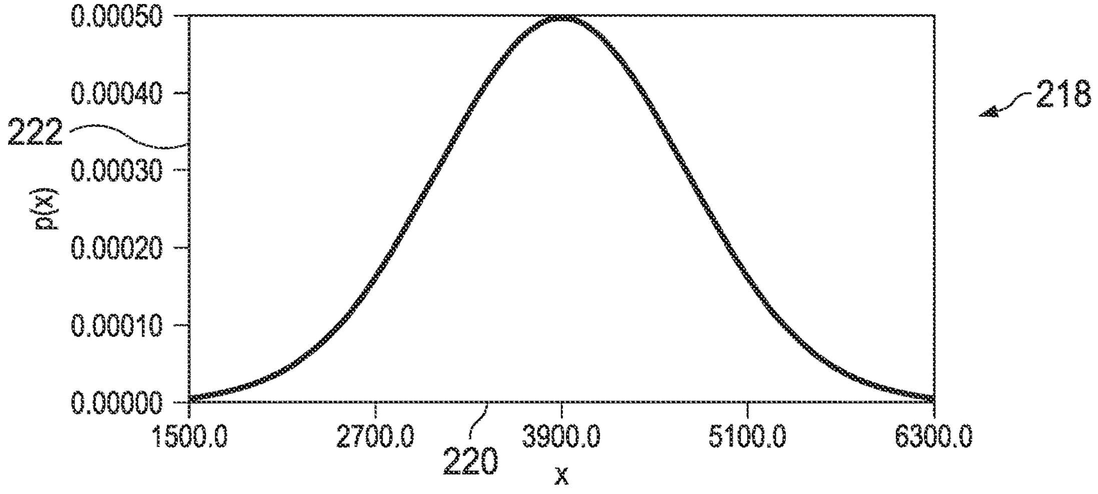
Figure 2E:
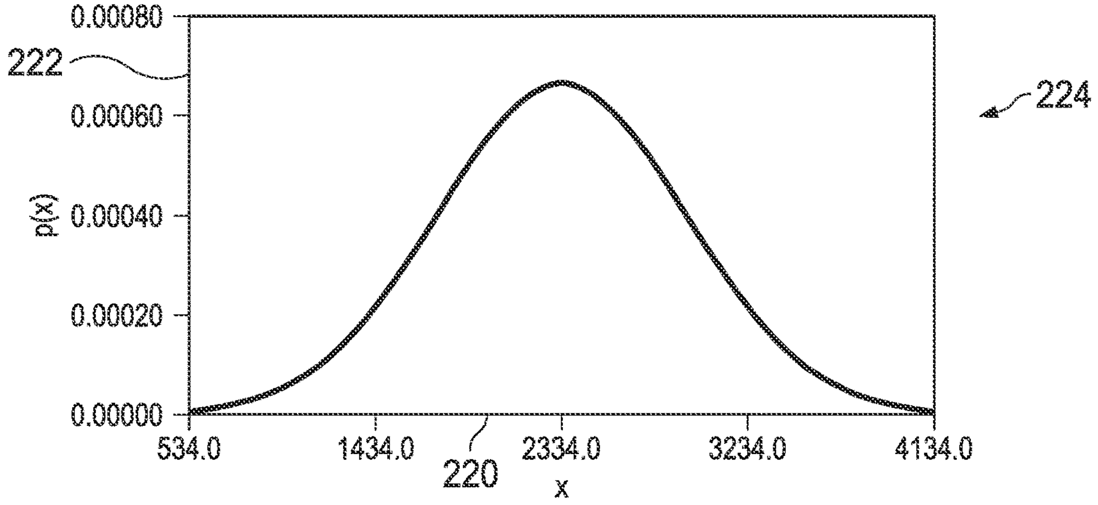
Figure 2F:
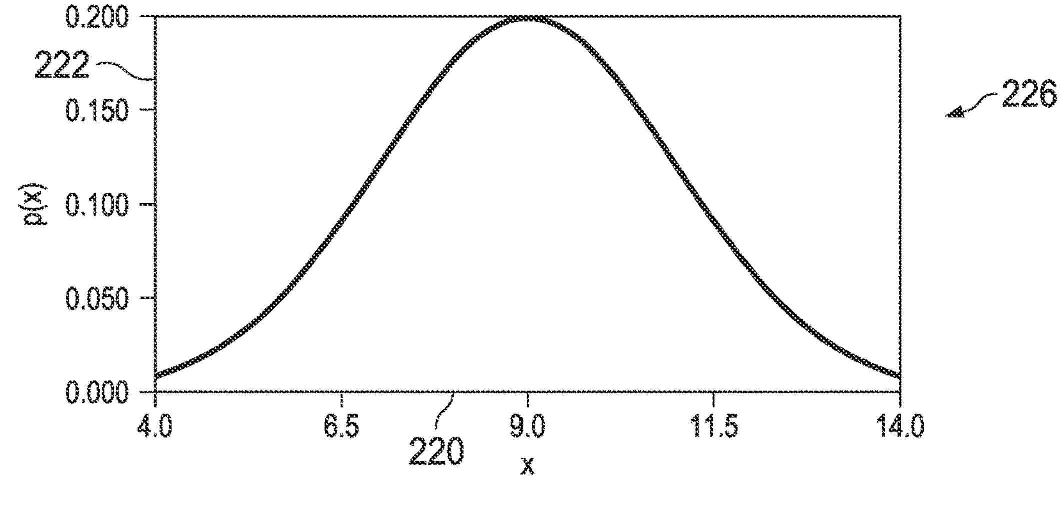

FIGS. 2A-2F are diagrams illustrating examples of graphs showing the best fit variogram model for long ranges and assigned uncertainties values, according to some implementations of the present disclosure. FIG. 2A is a graph 202 showing a parallel direction of points (e.g., 8188 point pairs) plotted relative to a lag 204 and a variance 206. Line 210 represents a best fit line range. Lines 208 and 212 describe an uncertainties envelope of the best fit range. FIG. 2B is a graph 214 showing a normal direction of points (e.g., 1769 point pairs) plotted relative to the lag 204 and the variance 206. FIG. 2C is a graph 216 showing a vertical direction of points (e.g., 9090 point pairs) plotted relative to the lag 204 and the variance 206. In this example, a normal distribution (as shown in FIGS. 2D-2F) has been chosen to provide more samples around the best fit variogram. In cases in which data samples are sparse, a uniform distribution can be used.

FIG. 2D is a graph 218 (corresponding to the graph 202 of FIG. 2A) showing a variogram range uncertainties envelope value distribution relative to an x axis 220 and a probability p(x) function 222. FIG. 2E is a graph 224 (corresponding to the graph 214 of FIG. 2B) showing a variogram range uncertainties envelope value distribution relative to the x axis 220 and the probability p(x) function 222. FIG. 2F is a graph 226 (corresponding to the graph 216 of FIG. 2C) showing a variogram range uncertainties envelope value distribution relative to an x axis 220 and a probability p(x) function 222.

At 1010, blind test wells are selected. In the current example, five wells were selected for blind tests in order to determine and understand the quality of porosity predictions based on selected variogram uncertainties ranges.

At 1012, geological rock properties are distributed.

At 1014, multiple correlations are computed. In the current example, two hundred multiple realizations were computed to distribute porosity and learn the outcome of large ranges of variogram ranges uncertainties.

Figure 3:
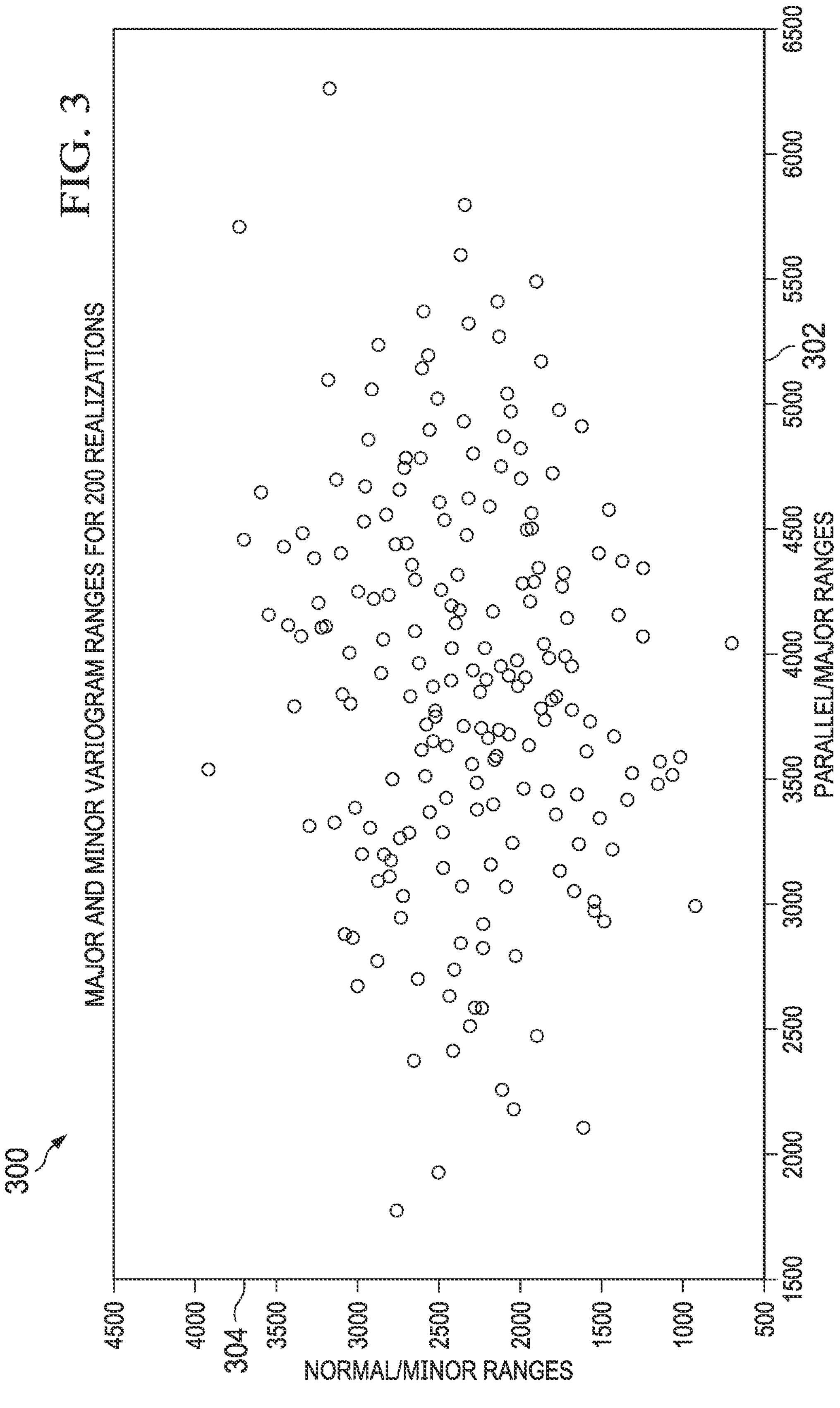
FIG. 3 is a scatterplot illustrating examples of cross-plot major and minor variogram ranges for 200 realizations, according to some implementations of the present disclosure.

FIG. 3 is a scatterplot 300 illustrating examples of cross-plot major and minor variogram ranges for 200 realizations, according to some implementations of the present disclosure. Points in the scatterplot 300 are plotted relative to a parallel/major range 302 and a normal/minor range 304.

At 1016, correlations are calculated for the blind test wells. In the current example, for each realization and for each blind test well, a correlation coefficient has been calculated between the actual and predicted porosity based on large variogram ranges. The high correlations coefficient realizations are identified and used to analyze the best possible variogram ranges uncertainties.

Figure 4:
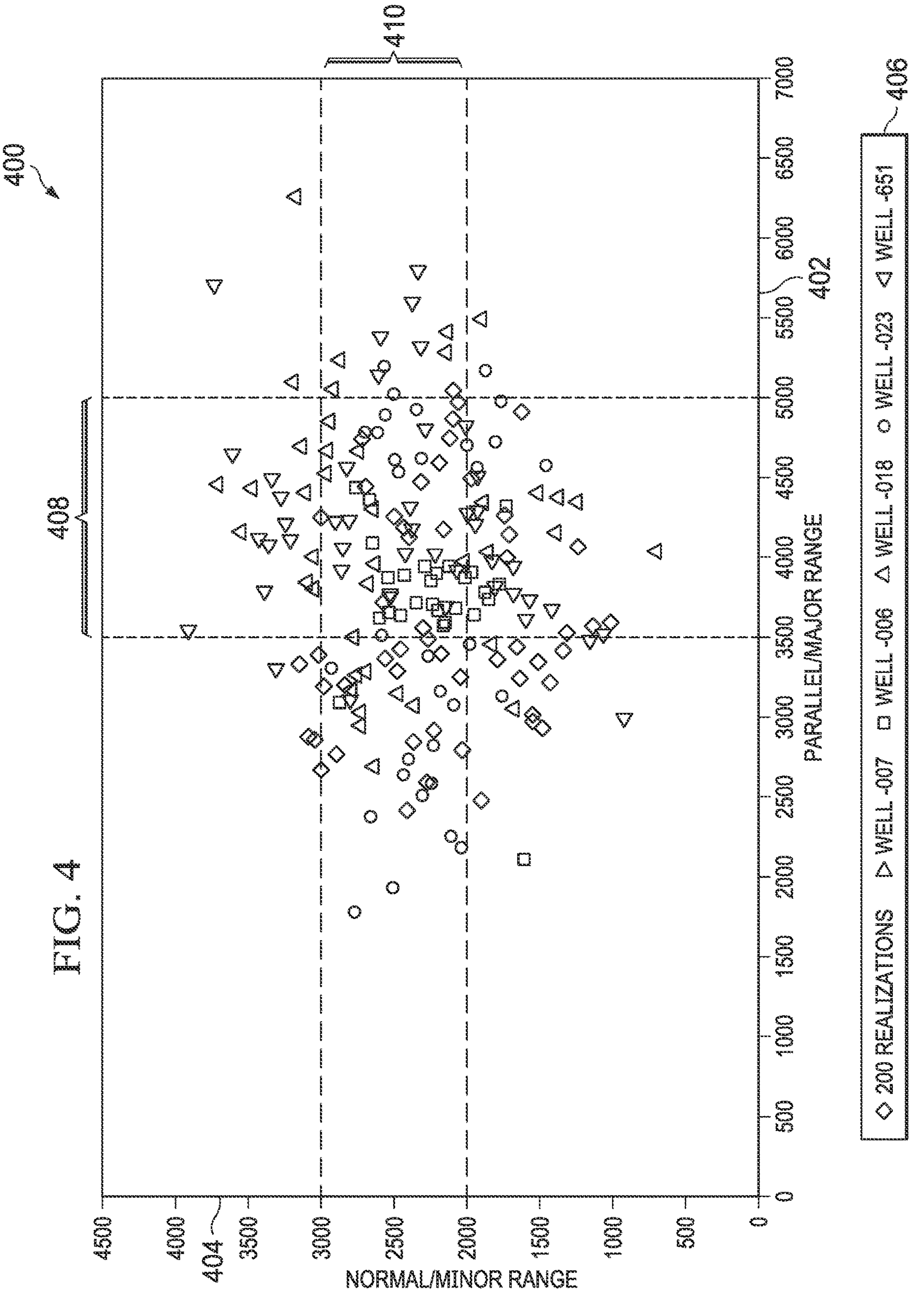
FIG. 4 is a scatterplot showing plotted points of the 200 realizations and the five blind test wells, according to some implementations of the present disclosure.

FIG. 4 is a scatterplot 400 showing plotted points of the 200 realizations and the five blind test wells, according to some implementations of the present disclosure. The scatterplot 400 shows cross-plot major and minor variogram ranges of high correlation realizations. Points in the scatterplot 400 are plotted relative to a parallel/major range 402 and a normal/minor range 404. The points are shaded relative to a legend 406 for the 200 realizations and the five wells.

Shaded ribbons 408 and 410 show optimized ranges for the points. The same ranges apply to the box and whisker plot (FIG. 5) of parallel/major direction variogram ranges for blind test wells of high correlation realizations (FIG. 6).

Figure 5:
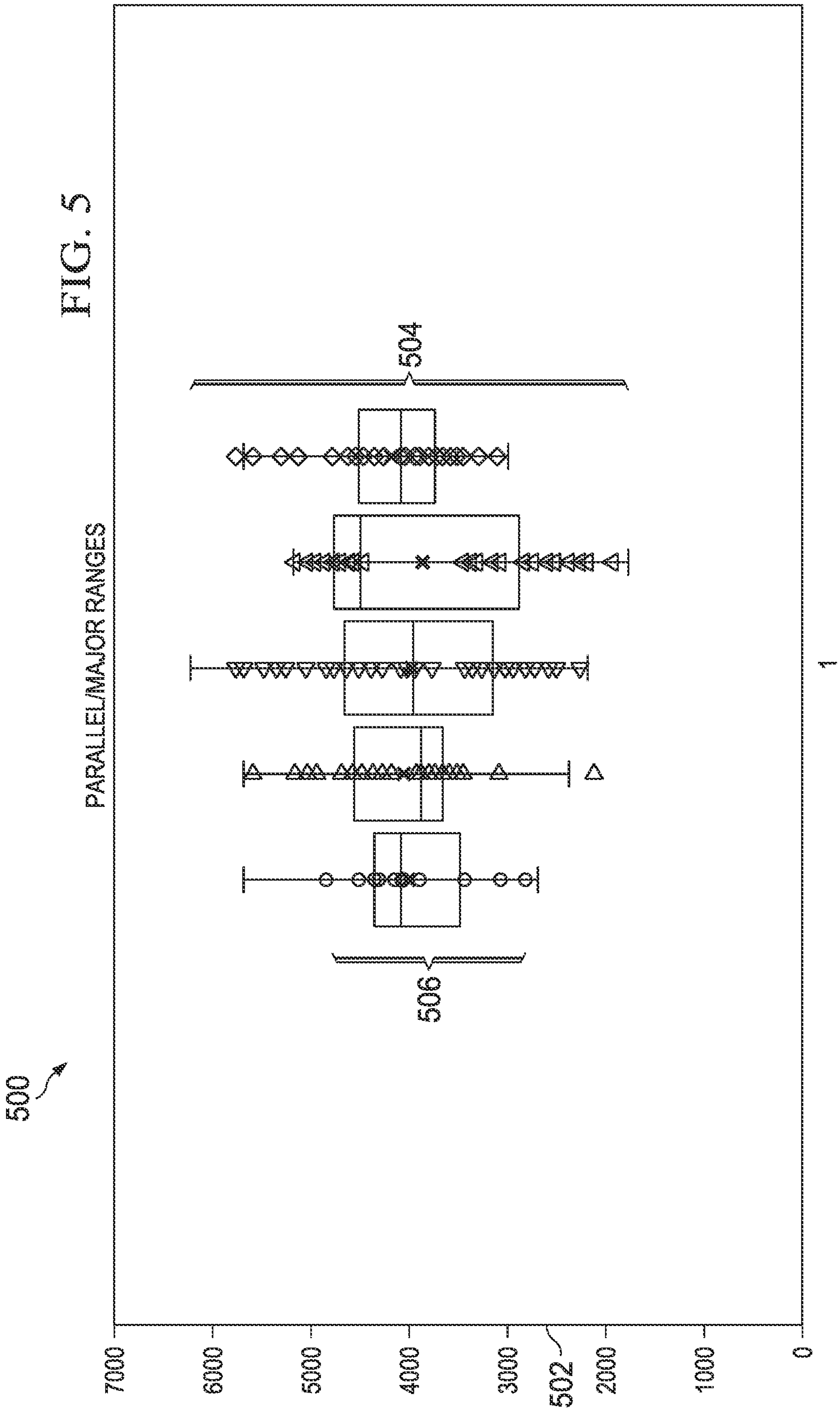
FIG. 5 is a box and whisker plot of parallel ranges versus normal range for blind test wells of high correlation realizations, according to some implementations of the present disclosure.

FIG. 5 is a box and whisker plot 500 of parallel ranges 504 versus normal range 506 for blind test wells of high correlation realizations, according to some implementations of the present disclosure. The plot 500 is plotted relative to variogram range numbers 502.

Figure 6:
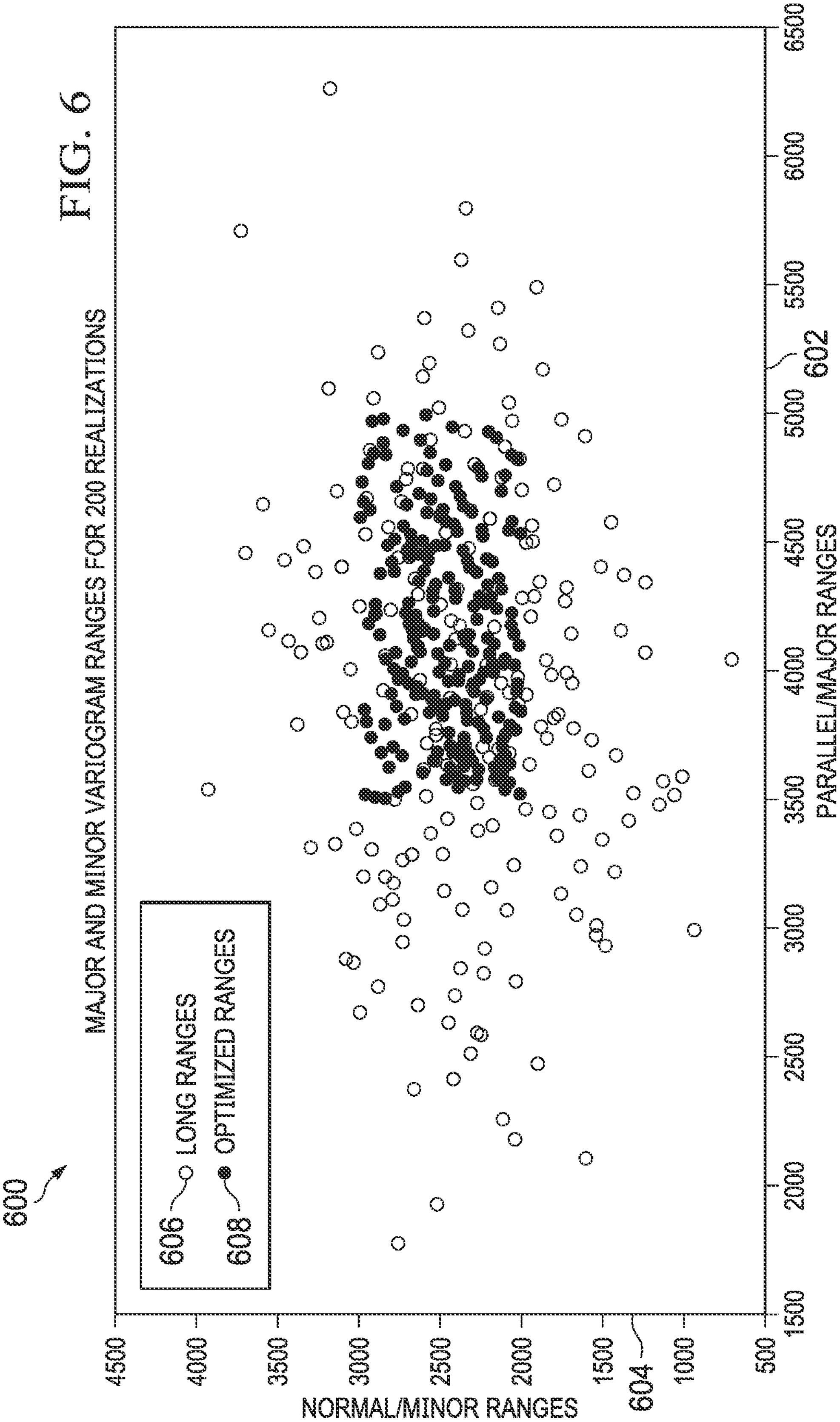
FIG. 6 is a scatterplot showing major and minor variogram ranges for the 200 realizations, according to some implementations of the present disclosure.

FIG. 6 is a scatterplot 600 showing examples of major and minor variogram ranges for the 200 realizations, according to some implementations of the present disclosure. The scatterplot 600 shows an uncertainty space of long uncertainty ranges versus optimized variogram ranges. Points in the scatterplot 600 are plotted relative to parallel/major ranges 602 and normal/minor ranges 604. Points in the scatterplot 600 are shaded differently for long ranges 606 and optimized ranges 608.

Tables 1A and 1B illustrate optimized ranges versus long ranges, prepared after extensive data analysis for Zones 1 and 2, respectively. The tables include standard deviation (std dev), minimum (min), and maximum (max) values.

TABLE 1A

Zone-1 Variogram Range Uncertainties

| | Model | Distribution | Mean | Std Dev | Min | Max |
|---|---|---|---|---|---|---|
| Parallel | Long Ranges | Normal | 3900 | 800 | 1500 | 6300 |
| | Optimized Ranges | Normal | 3900 | 800 | 3500 | 5000 |
| Normal | Long Ranges | Normal | 2334 | 600 | 534 | 4134 |
| | Optimized Ranges | Normal | 2334 | 600 | 2000 | 3000 |
| Vertical | Long Ranges | Normal | 9 | 2 | 4 | 14 |
| | Optimized Ranges | Normal | 9 | 2 | 4 | 14 |

TABLE 1B

Zone-2 Variogram Range Uncertainties

| | Model | Distribution | Mean | Std. Dev | Min | Max |
|---|---|---|---|---|---|---|
| Parallel | Long Ranges | Normal | 3731 | 900 | 1031 | 6431 |
| | Optimized Ranges | Normal | 3731 | 900 | 3000 | 4400 |
| Normal | Long Ranges | Normal | 2086 | 600 | 286 | 3886 |
| | Optimized Ranges | Normal | 2086 | 600 | 1500 | 3400 |
| Vertical | Long Ranges | Normal | 8 | 2 | 4 | 14 |
| | Optimized Ranges | Normal | 8 | 2 | 4 | 14 |

In the current example, two hundred realizations were computed using optimized variogram ranges, and then observed. The optimized variogram ranges also predict acceptable high correlations between actual and predicted porosity for the blind test wells.

At 1018, a determination is made whether the correlations made at 1016 are acceptable. If the correlations are not acceptable, then processing in the workflow returns to step 1008.

FIGS. 7A-7H are graphs collectively showing examples of cross plots between parallel/major and normal/minor direction variogram ranges, according to some implementations of the present disclosure. FIGS. 7A-7H illustrate an uncertainty space of long variogram uncertainty ranges versus optimized variogram ranges. This not only provides the optimized ranges uncertainties but also reduces the statistical spread of variogram ranges uncertainties.

Figure 7A:
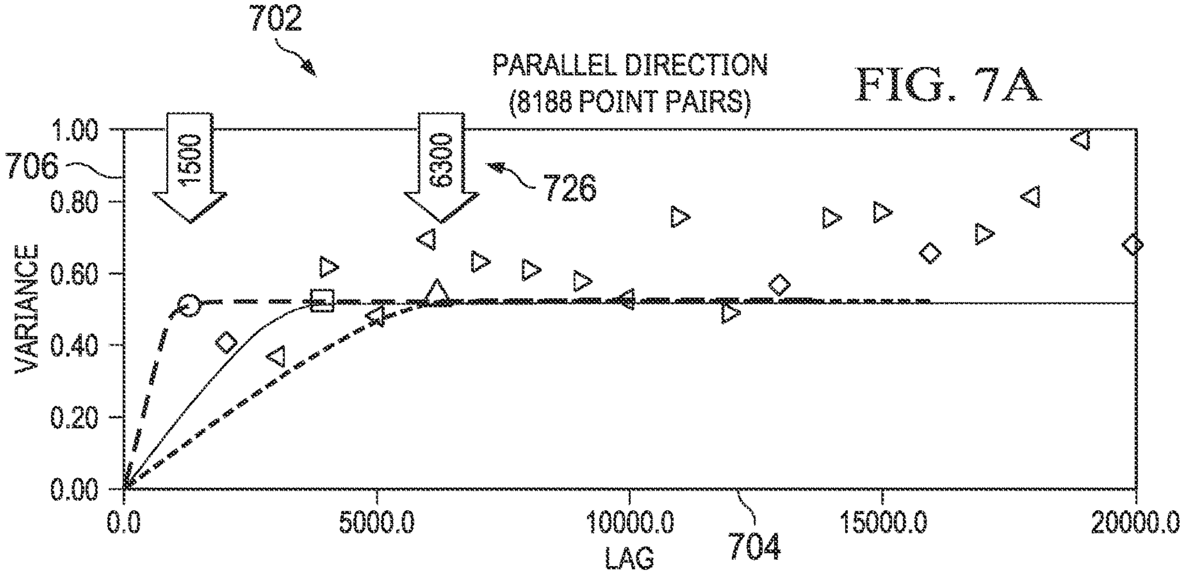
FIGS. 7A-7H are graphs collectively showing examples of cross plots between parallel/major and normal/minor direction variogram ranges, according to some implementations of the present disclosure.
Figure 7B:
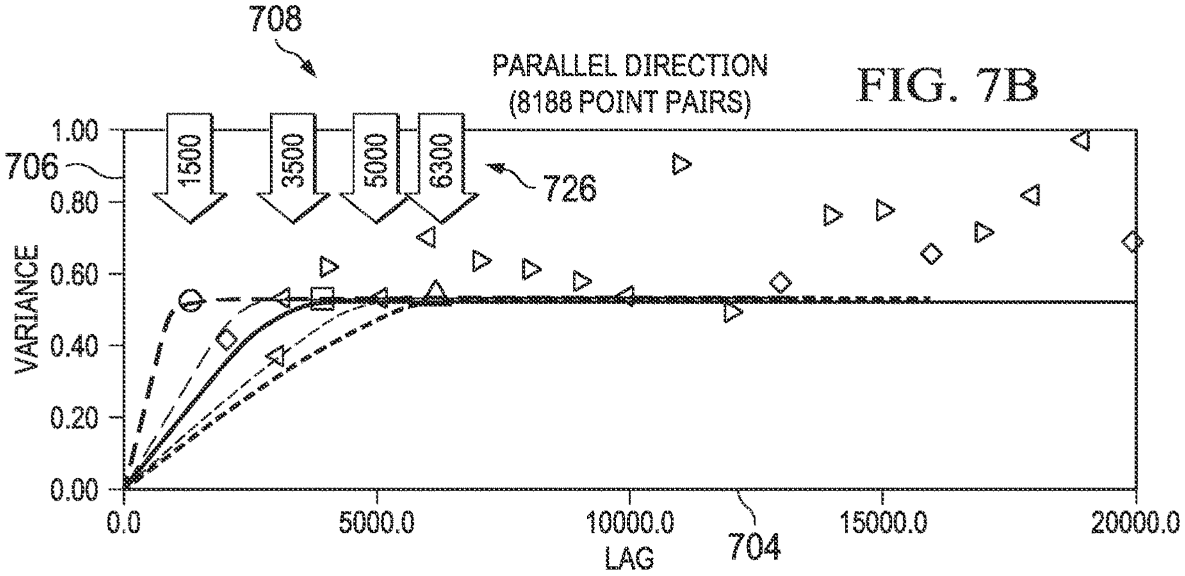
Figure 7C:
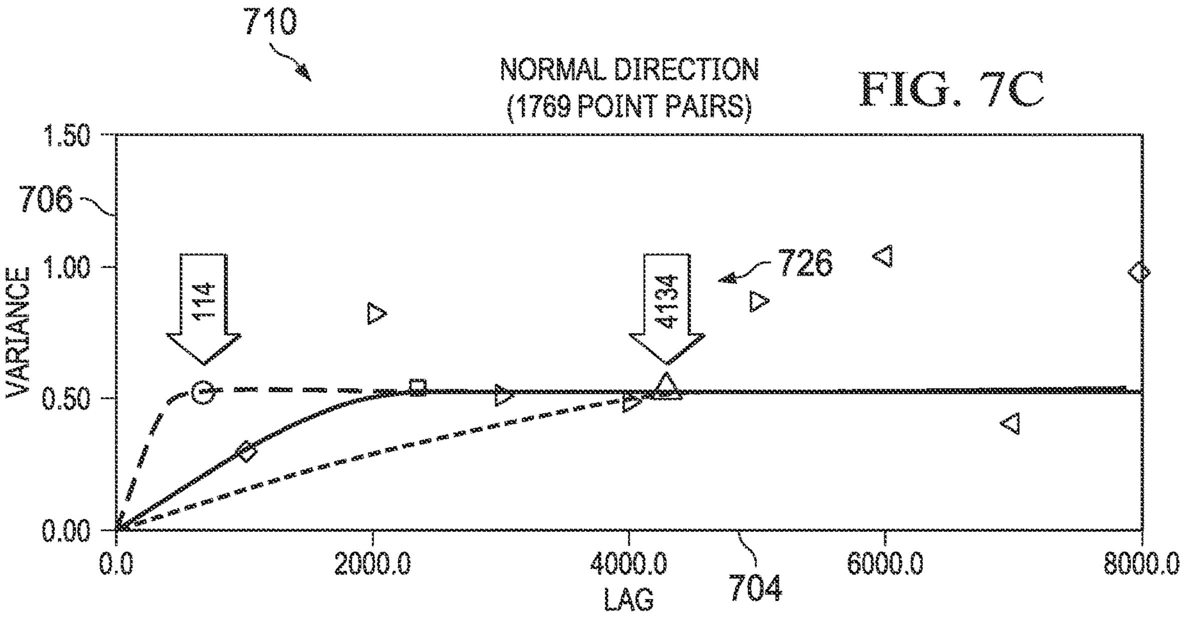
Figure 7D:
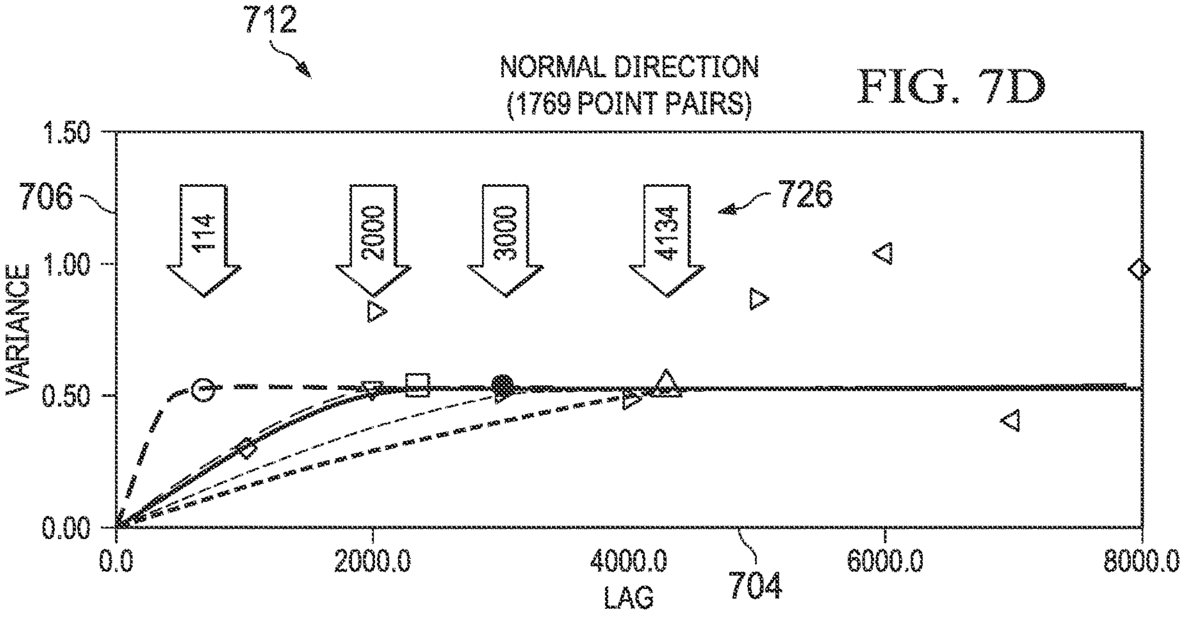

Graph 702 in FIG. 7A is plotted relative to lag 704 and variance 706. Parallel direction graph 702 in FIG. 7A is plotted relative to lag 704 and variance 706. Parallel direction graph 708 in FIG. 7B is plotted relative to lag 704 and variance 706. FIG. 7A arrows 726 represent initial parallel variogram ranges. FIG. 7B arrows 726 represent initial and optimized variogram ranges. FIGS. 7C and 7D arrows 726 represent normal variogram direction ranges. Normal direction graph 710 in FIG. 7C is plotted relative to lag 704 and variance 706. Normal direction graph 712 in FIG. 7D is plotted relative to lag 704 and variance 706.

Figure 7E:
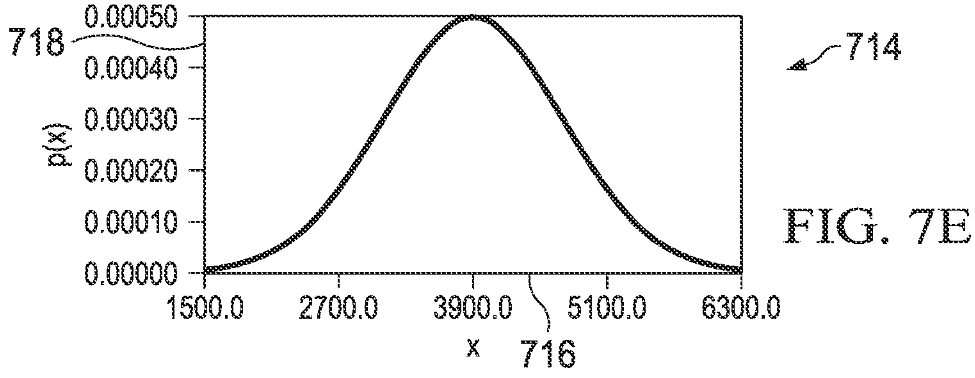
Figure 7F:
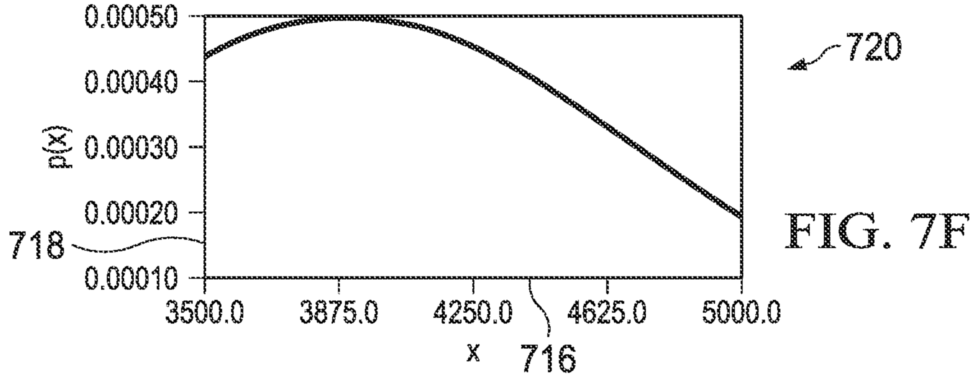
Figure 7G:
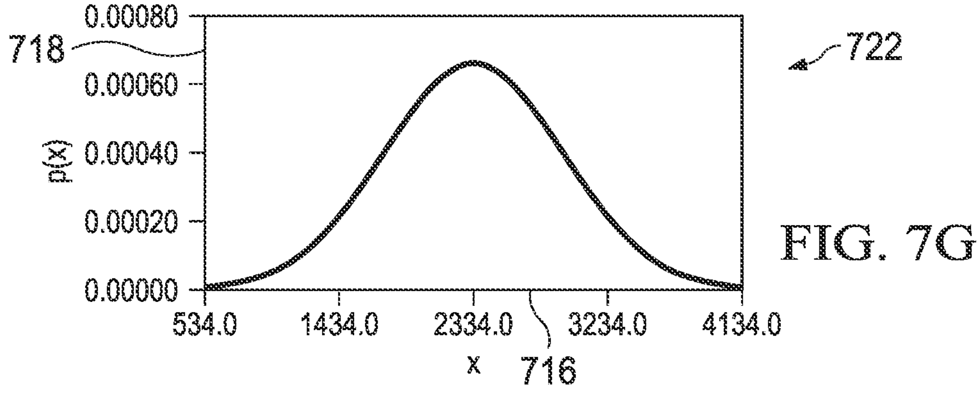
Figure 7H:
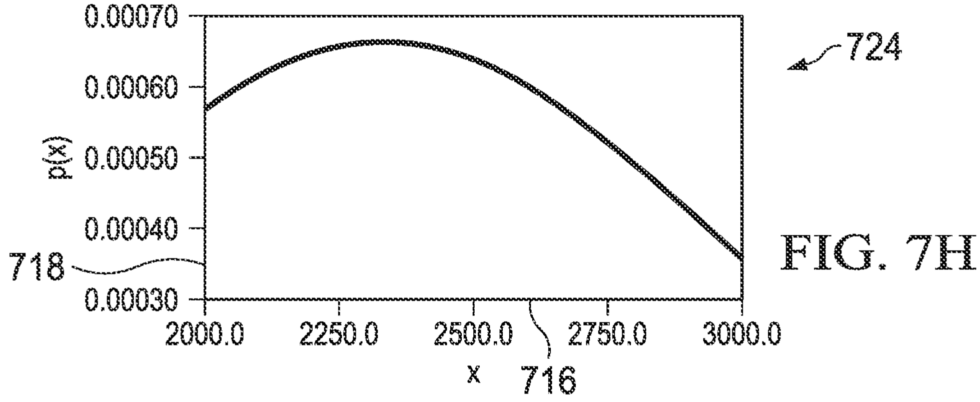
Figure 8A:
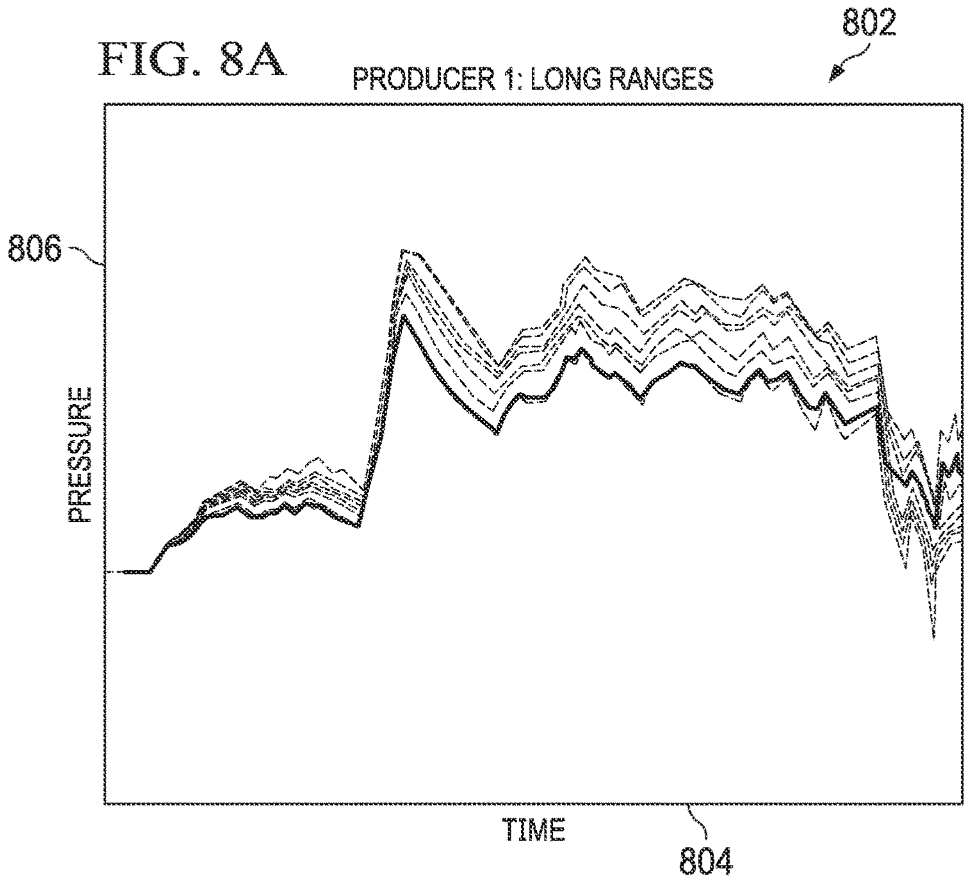
FIGS. 8A-8H are graphs collectively showing examples of dynamic variability of pressure at four producer wells, according to some implementations of the present disclosure.
Figure 8B:
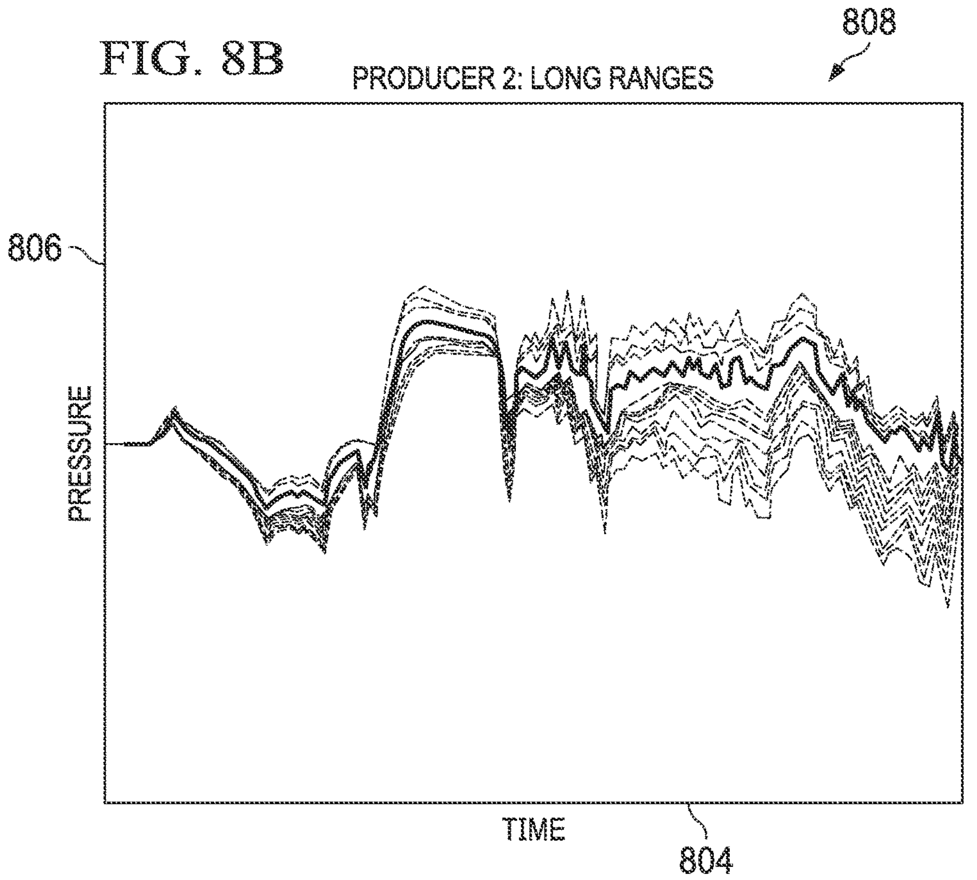
Figure 8C:
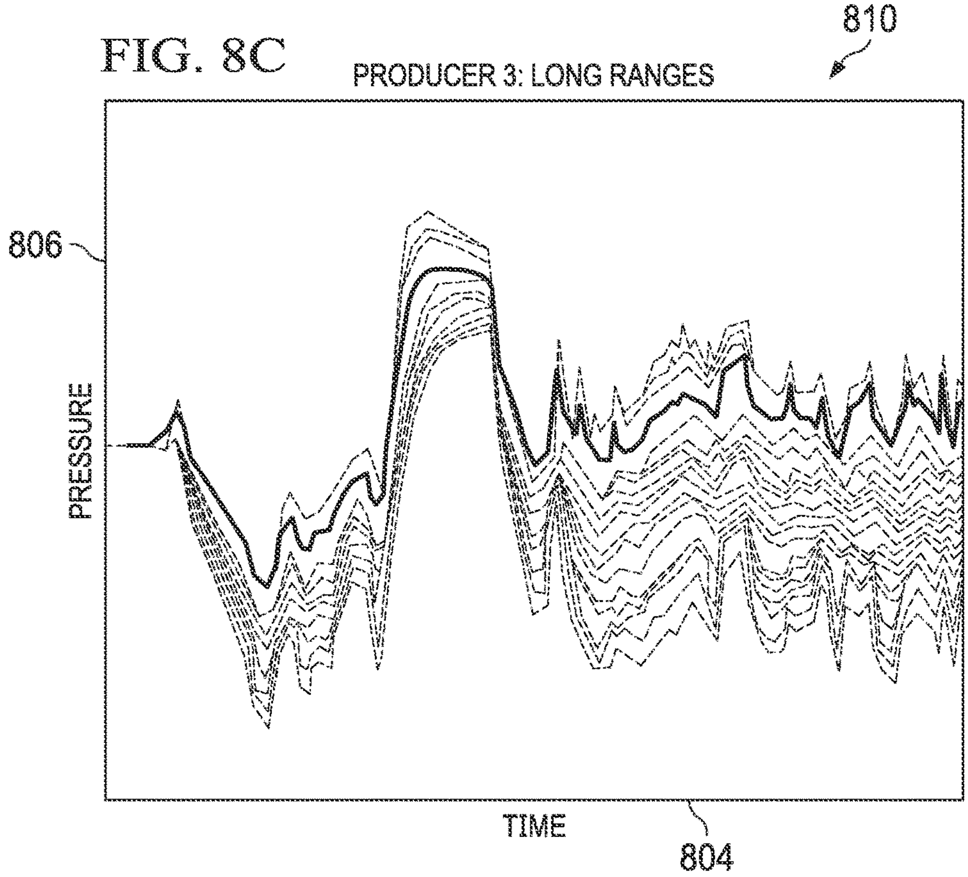
Figure 8D:
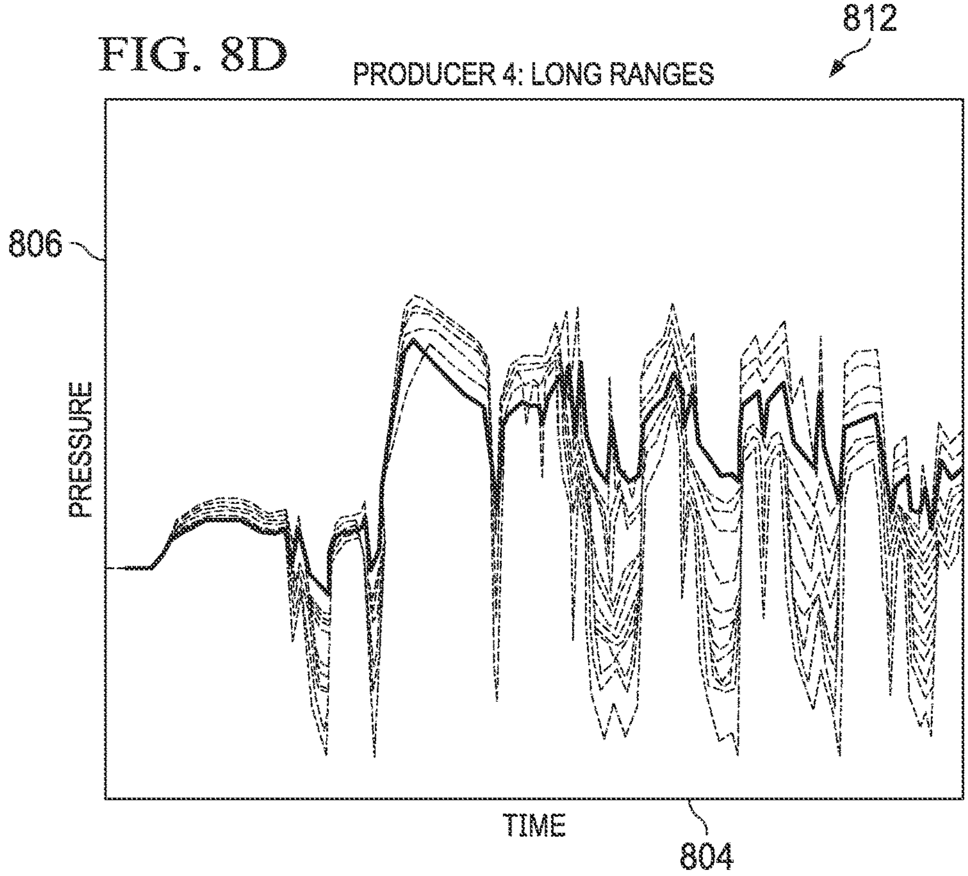
Figure 8E:
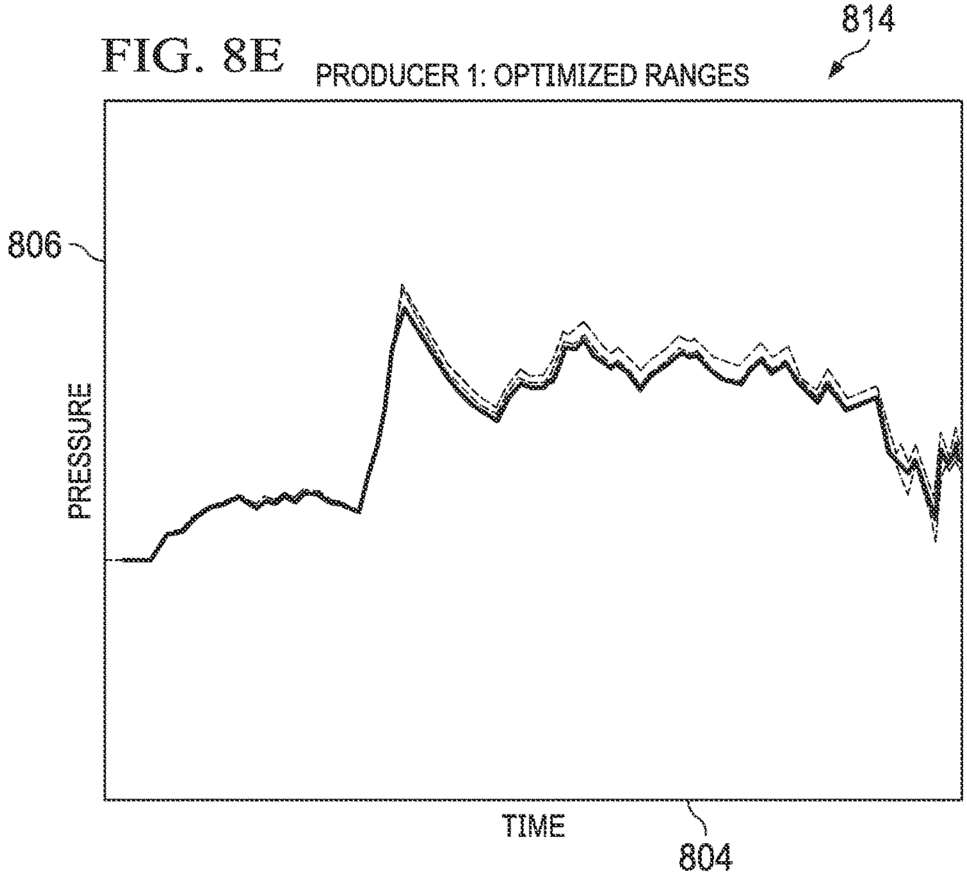
Figure 8F:
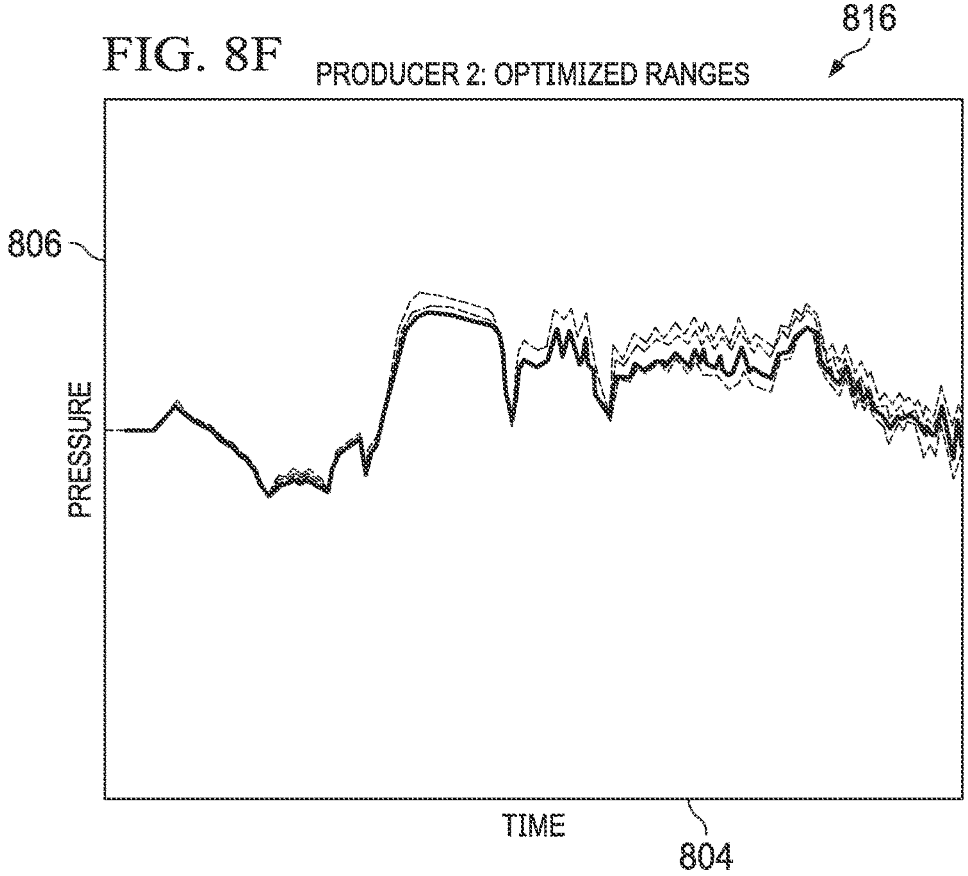
Figure 8G:
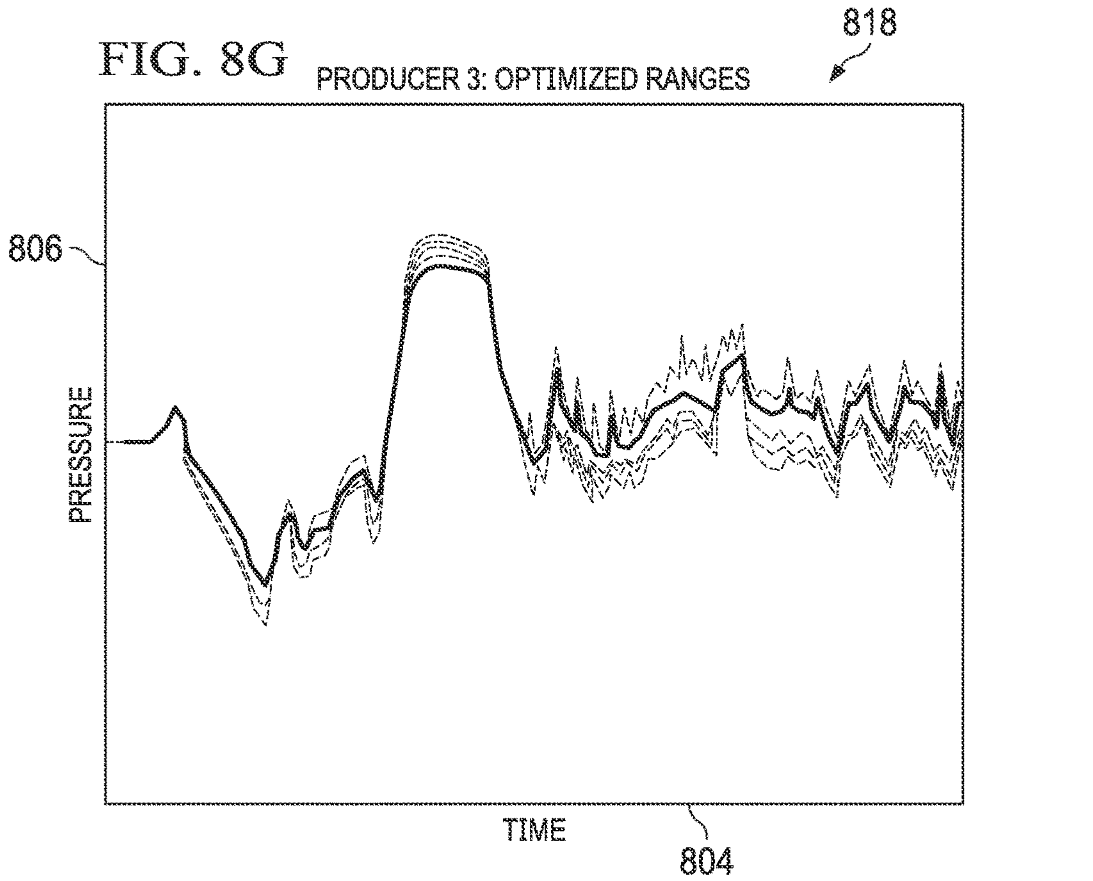
Figure 8H:
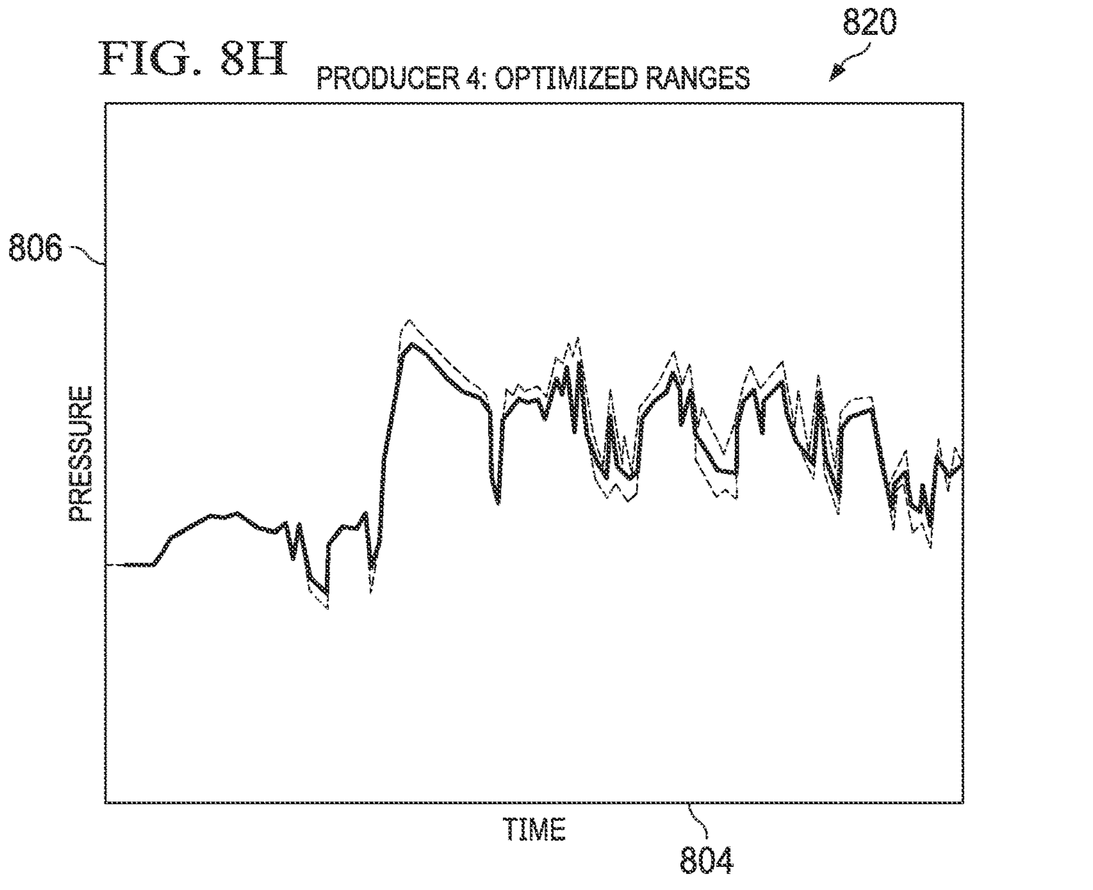
Figure 9A:
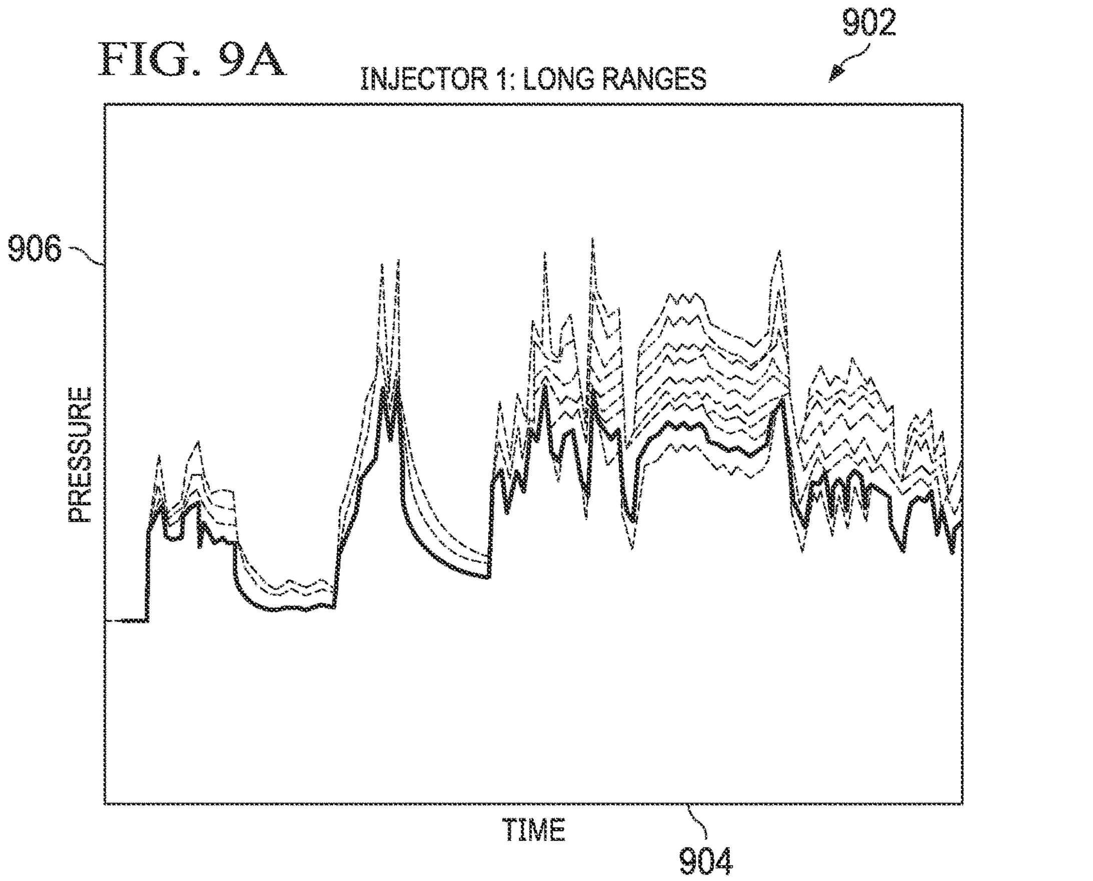
FIGS. 9A-9H are graphs collectively showing examples of dynamic variability of pressure at four injector wells, according to some implementations of the present disclosure.
Figure 9B:
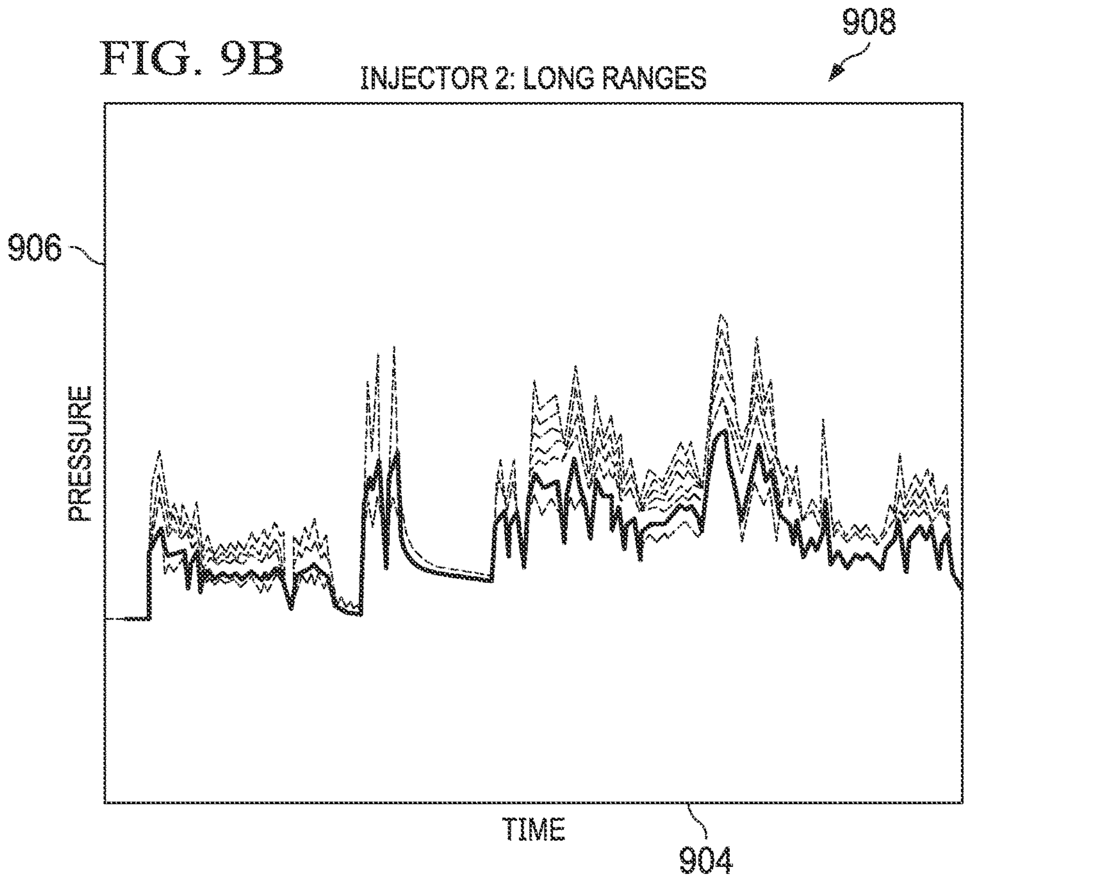
Figure 9C:
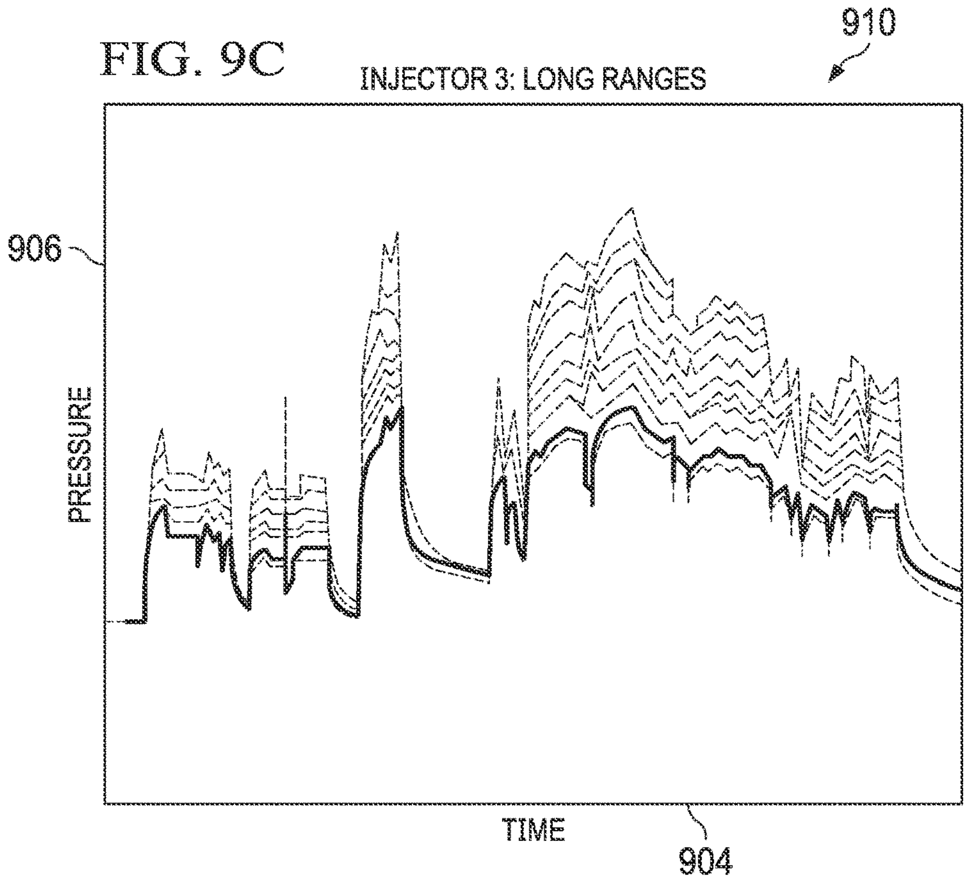
Figure 9D:
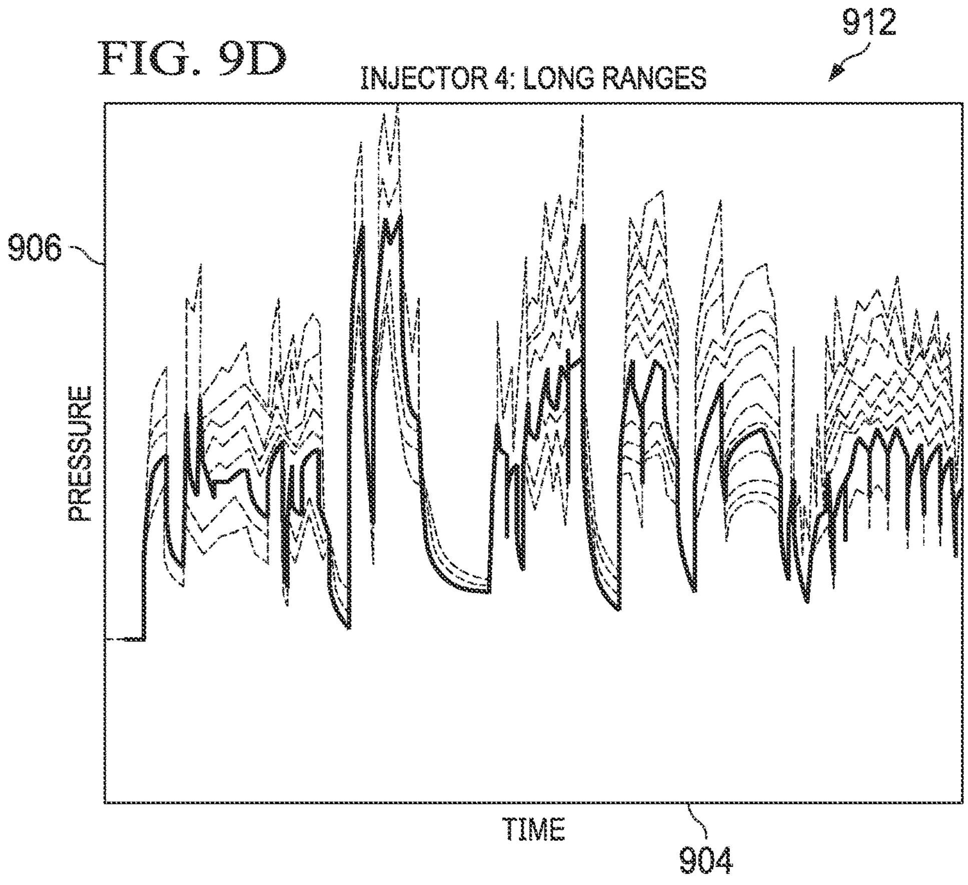
Figure 9E:
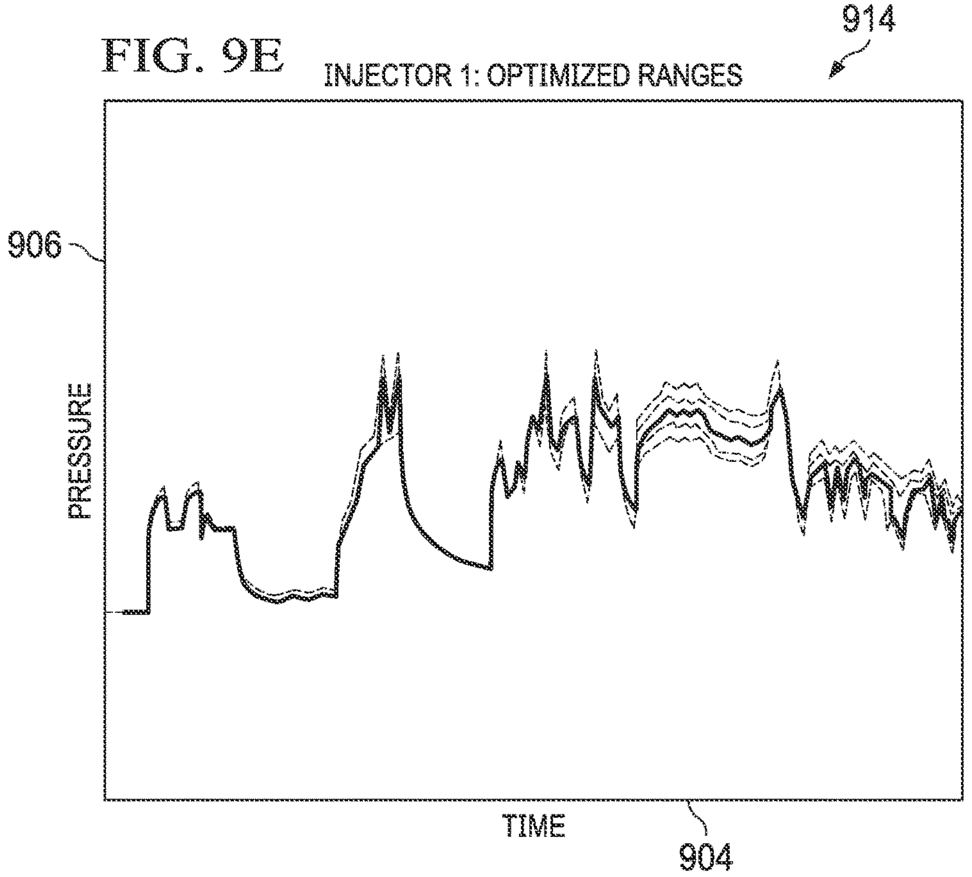
Figure 9F:
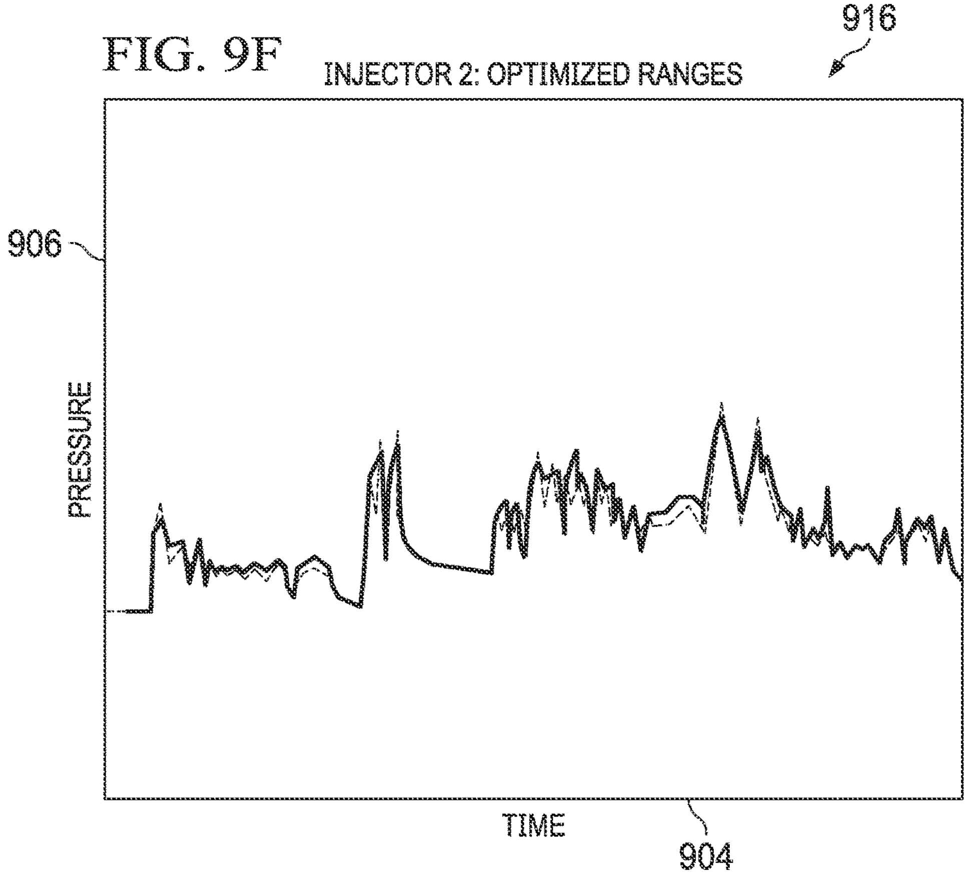
Figure 9G:
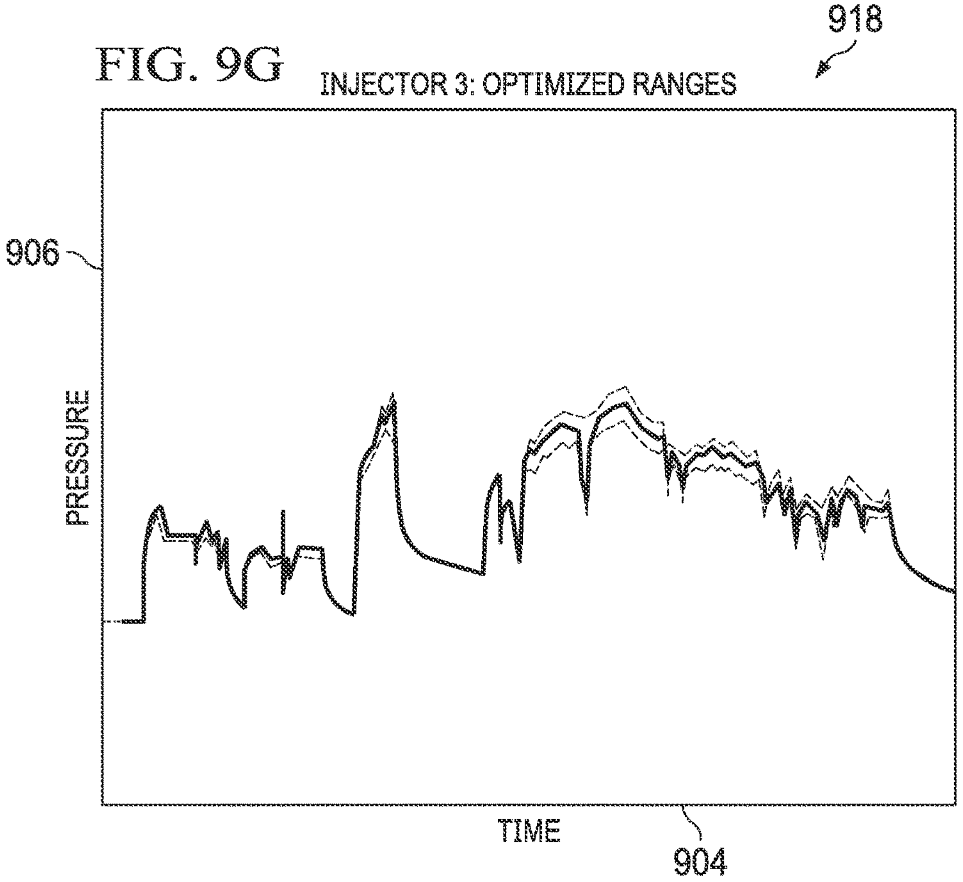
Figure 9H:
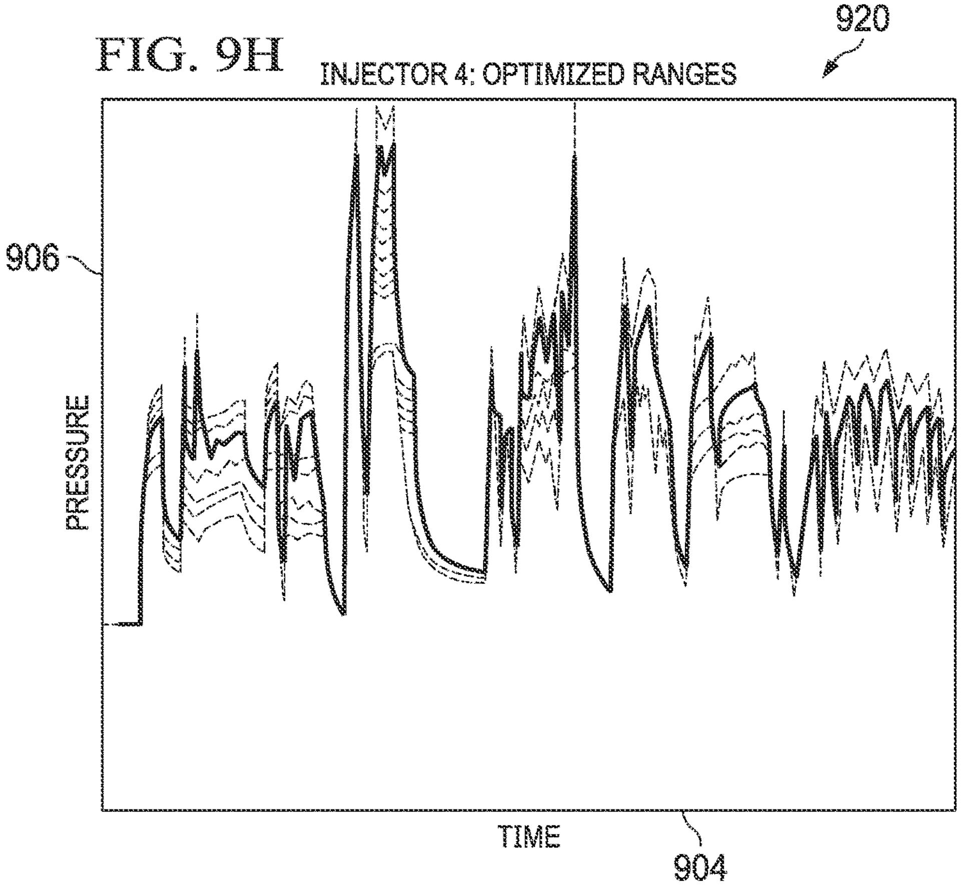

FIG. 7E is a graph 714 (corresponding to the graph 702 of FIG. 7A) showing results relative to an x-axis 716 and a probability p(x) function 718. FIG. 7F is a graph 720 (corresponding to the graph 708 of FIG. 7B) showing results relative to the x-axis 716 and the probability p(x) function 718. FIG. 7G is a graph 722 (corresponding to the graph 710 of FIG. 7C) showing results relative to the x-axis 716 and the probability p(x) function 718. FIG. 7H is a graph 724 (corresponding to the graph 712 of FIG. 7D) showing results relative to the x-axis 716 and the probability p(x) function 718.

At 1020, high correlation realizations are used to optimize variogram ranges. As a result, optimized variogram uncertainty ranges that are generated in all three directions (major, minor and vertical) are quantified and are available to be used in the total uncertainty workflow. FIG. 8 illustrates the optimized variogram ranges uncertainties space versus long range uncertainties space for a parallel/major and normal/minor direction variogram model.

At 1022, multiple realizations are computed for a same seed number and optimized variogram ranges, and correlations are calculated for the blind test wells. For example, porosity and permeability models, represented with long and optimized variogram ranges, can be evaluated in terms of dynamic variability using reservoir flow simulation model. In conducting tests and experiments in the current example, a series of 28 design of experiments (DoE) scenarios per variogram range definition were conducted using a 2-level DoE to validate an uncertainty envelope and a 3-level DoE to refine intra-envelope parameter uncertainty sampling. The uncertainty ranges for variogram parameters were implemented as per Table 1. The comparative variability analyses were conducted for 4 identified producer wells and 4 identified injector wells. The target dynamic response vector is well pressure. Results presented in FIGS. 8 and 9 indicate a significant reduction of statistical spread (variance) and a consequential increase of precision and accuracy relative to historic/observed data. For example, significantly improved and more reliable history match is shown over the ensemble of dynamic scenarios, when simulating porosity and permeability models with optimized variogram range. Quantitatively, the improvement in dynamic response precision is given in Table 2.

Steps 1020 and 1022 are repeated until an accepted correlation 1024 is determined. Then, at 1026, the final optimized variogram range uncertainties are available.

The relative difference for Mean can be calculated as:

100*(Mean_Long−Mean_Optimized)/Mean_Long (1)

The relative difference for Std_Dev can be calculated as:

100*(Std_Dev_Long−Std_Dev_Optimized)/Std_Dev_Long (2)

The use of optimized variogram ranges improves precision (Std_Dev) of simulated pressure response on average by 28% for producer wells and 34% for injector wells. The average variability in accuracy (mean) remains within 3% for producers and within 7% for injectors. This is an expected/positive outcome, since optimization of variogram ranges should not affect the property's mean, but only reduce statistical spread, and this should reflect onto a dynamic response as well.

TABLE 2

Statistical Comparison Of Simulation Response

| Well | Long Variogram Mean (psi) | Std dev (psi) | Optimized Variogram Mean (psi) | Std dev (psi) | Relative Difference Mean (%) | Std dev (%) |
|---|---|---|---|---|---|---|
| Producer 1 | 2249.9 | 24.9 | 2223.5 | 9.4 | 1.2 | 62.3 |
| Producer 2 | 2096.0 | 70.7 | 2143.2 | 17.8 | −2.3 | 74.8 |
| Producer 3 | 1951.1 | 130.7 | 2088.9 | 34.1 | −7.1 | 73.9 |
| Producer 4 | 2151.5 | 63.6 | 2192.5 | 14.2 | −1.9 | 77.6 |
| Injector 1 | 2894.3 | 252.6 | 2755.7 | 88.8 | 4.8 | 64.8 |
| Injector 2 | 2586.6 | 180.0 | 2469.6 | 49.2 | 4.5 | 72.7 |
| Injector 3 | 2907.4 | 294.8 | 2672.4 | 51.5 | 8.1 | 82.5 |
| Injector 4 | 3328.7 | 426.8 | 3043.5 | 241.6 | 8.6 | 43.4 |

FIGS. 8A-8H are graphs collectively showing examples of dynamic variability of pressure at four producer wells, according to some implementations of the present disclosure. The graphs correspond to porosity-permeability realizations modeled with variogram long ranges (graphs 802, 808, 810, and 812 of FIGS. 8A-8D, corresponding to the four wells) and optimized ranges (graphs 814, 816, 818, and 820 of FIGS. 8E-8H, corresponding to the four wells). Dashed lines correspond to variability plots depicting results of 28 simulation runs. Dark lines represent observed/historic pressure. Pressure axes 906 are normalized for all wells. The graphs are plotted relative to time 804 and pressure 806.

FIGS. 9A-9H are graphs collectively showing examples of dynamic variability of pressure at four injector wells, according to some implementations of the present disclosure. The graphs correspond to porosity-permeability realizations modeled with variogram long ranges (graphs 902, 908, 910, and 912 of FIGS. 9A-9D, corresponding to the four wells) and optimized ranges (graphs 914, 916, 918, and 920 of FIGS. 9E-9H, corresponding to the four wells). Dashed lines correspond to variability plots depicting results of 28 simulation runs. Dark lines represent observed/historic pressure. Pressure axes 906 are normalized for all wells. The graphs are plotted relative to time 904 and pressure 906.

Figure 11:
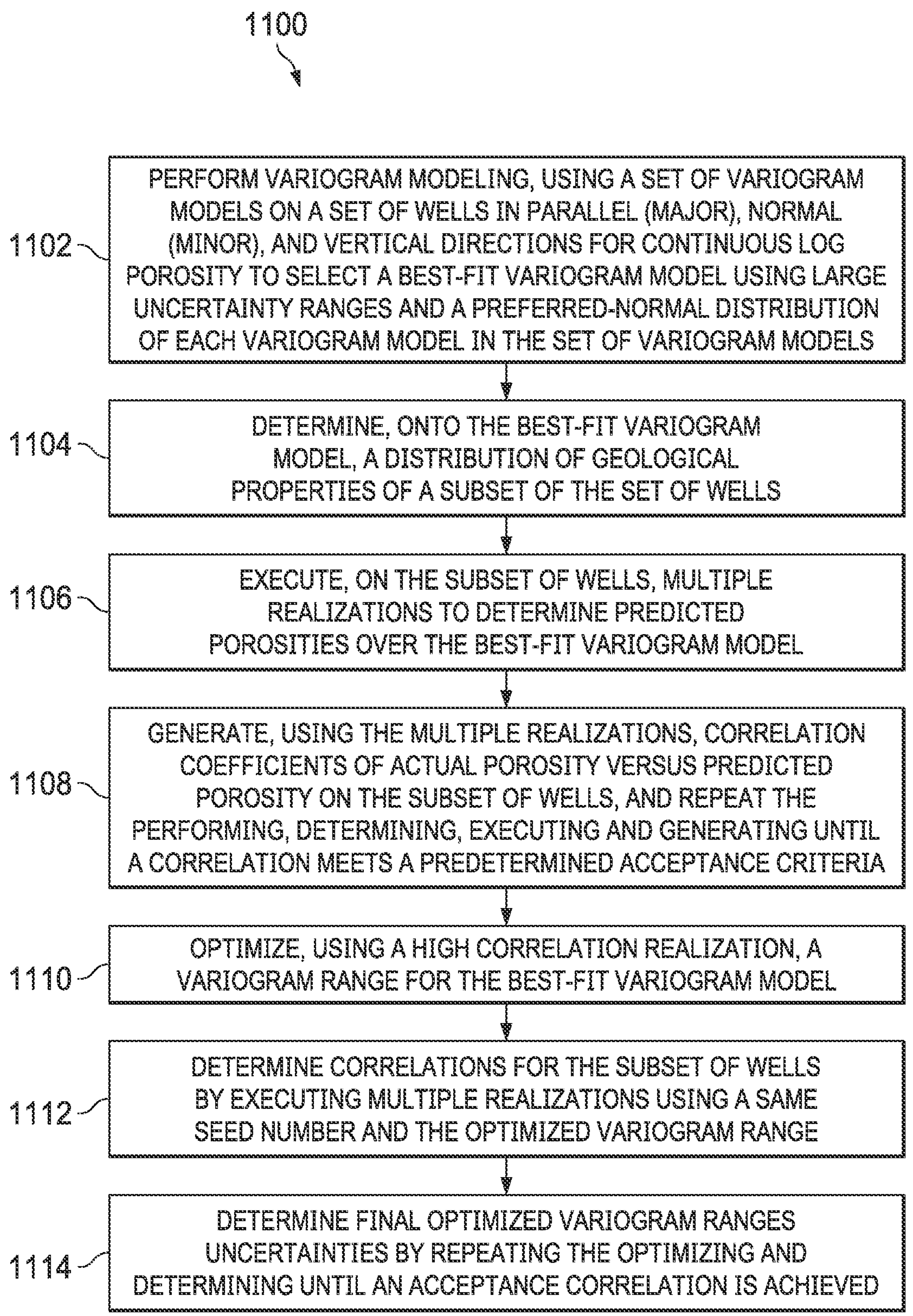
FIG. 11 is a flowchart of an example of a method for determining optimized variogram ranges, according to some implementations of the present disclosure.

FIG. 11 is a flowchart of an example of a method 1100 for determining optimized variogram ranges, according to some implementations of the present disclosure. For clarity of presentation, the description that follows generally describes method 1100 in the context of the other figures in this description. However, it will be understood that method 1100 can be performed, for example, by any suitable system, environment, software, and hardware, or a combination of systems, environments, software, and hardware, as appropriate. In some implementations, various steps of method 1100 can be run in parallel, in combination, in loops, or in any order.

At 1102, variogram modeling is performed using a set of variogram models on a set of wells in parallel (major), normal (minor), and vertical directions for continuous log porosity to select a best-fit variogram model using large uncertainty ranges and a preferred-normal distribution of each variogram model in the set of variogram models. The set of wells can be selected, for example, by determining suitable wells on which to analyze variograms model. For example, determining the suitable wells can include selecting only vertical wells not having horizontal sections. From 1102, method 1100 proceeds to 1104.

At 1104, a distribution of geological properties of a subset of the set of wells is determined onto the best-fit variogram model. The subset of the set of wells can be a set of blind test wells, for example. From 1104, method 1100 proceeds to 1106.

At 1106, multiple realizations are executed on the subset of wells to determine predicted porosities over the best-fit variogram model. The realizations can follow the steps of workflow 1000, for example. From 1106, method 1100 proceeds to 1108.

At 1108, correlation coefficients of actual porosity versus predicted porosity are generated on the subset of wells using the multiple realizations. The performing, determining, executing, and generating can be repeated until a correlation meets a predetermined acceptance criteria. From 1108, method 1100 proceeds to 1110.

At 1110, a variogram range for the best-fit variogram model is optimized using a high correlation realization. The optimization can follow the steps of workflow 1000, for example. From 1110, method 1100 proceeds to 1112.

At 1112, correlations are determined for the subset of wells by executing multiple realizations using a same seed number and the optimized variogram range. The correlations can follow the steps of workflow 1000, for example. From 1112, method 1100 proceeds to 1114.

At 1114, final optimized variogram ranges uncertainties are determined by repeating the optimizing and determining until an acceptance correlation is achieved. The final optimized variogram ranges can follow the steps of workflow 1000, for example. After 1114, method 1100 can stop.

In some implementations, method 1100 further includes generating a scatterplot for display in a user interface, where the scatterplot includes points for the multiple realizations and points for the subset of the wells plotted relative to a parallel/major range and a normal/minor range. The scatterplot can be enhanced, for example, by overlaying, onto the scatterplot, shaded ribbons identifying optimized ranges of the parallel/major range and the normal/minor range.

In some implementations, method 1100 further includes conducting tests and experiments using a series of design of experiments (DoE) scenarios per variogram range definition, including executing 2-level DoE to validate uncertainty envelopes and executing 3-level DoE to refine intra-envelope parameter uncertainty samplings. For example, the tests and experiments can correspond to the steps of workflow 1000 and used to validate the workflow.

In some implementations, in addition to (or in combination with) any previously-described features, techniques of the present disclosure can include the following. Customized user interfaces can present intermediate or final results of the above described processes to a user. The presented information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change or an improvement in drilling parameters (including speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 12:
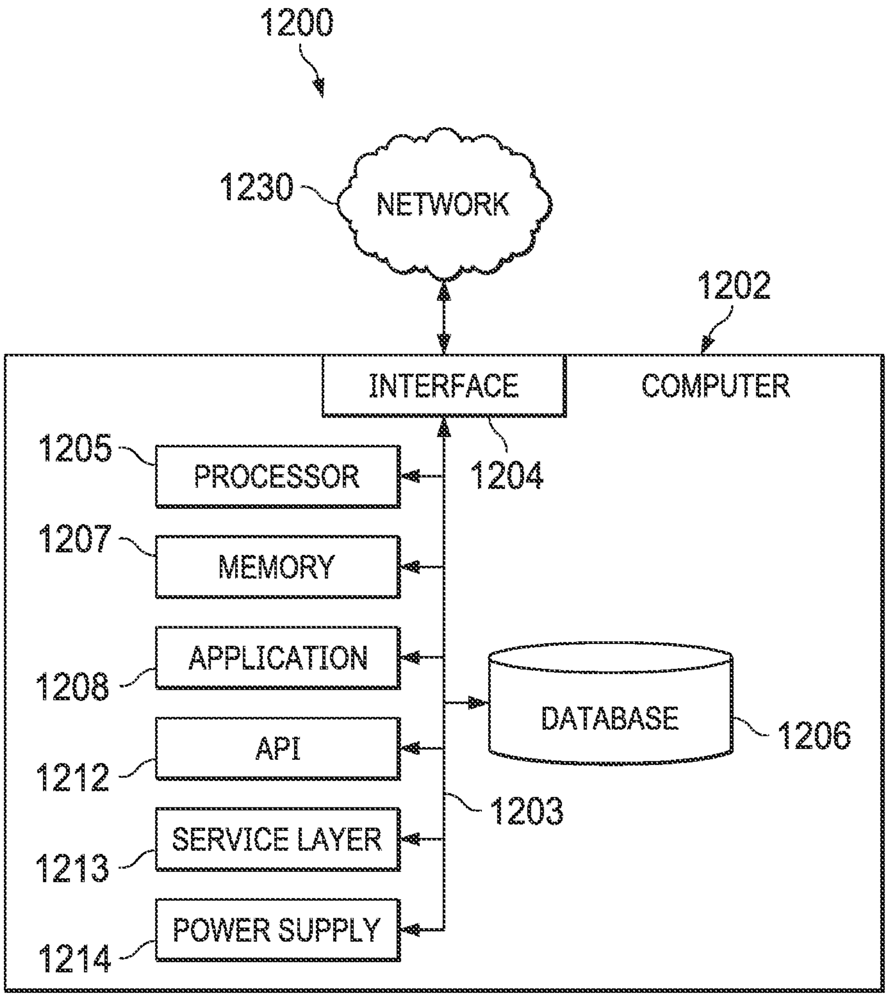
FIG. 12 is a block diagram illustrating an example computer system used to provide computational functionalities associated with described algorithms, methods, functions, processes, flows, and procedures as described in the present disclosure, according to some implementations of the present disclosure.

FIG. 12 is a block diagram of an example computer system 1200 used to provide computational functionalities associated with described algorithms, methods, functions, processes, flows, and procedures described in the present disclosure, according to some implementations of the present disclosure. The illustrated computer 1202 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1202 can include input devices such as keypads, keyboards, and touch screens that can accept user information. Also, the computer 1202 can include output devices that can convey information associated with the operation of the computer 1202. The information can include digital data, visual data, audio information, or a combination of information. The information can be presented in a graphical user interface (UI) (or GUI).

The computer 1202 can serve in a role as a client, a network component, a server, a database, a persistency, or components of a computer system for performing the subject matter described in the present disclosure. The illustrated computer 1202 is communicably coupled with a network 1230. In some implementations, one or more components of the computer 1202 can be configured to operate within different environments, including cloud-computing-based environments, local environments, global environments, and combinations of environments.

At a top level, the computer 1202 is an electronic computing device operable to receive, transmit, process, store, and manage data and information associated with the described subject matter. According to some implementations, the computer 1202 can also include, or be communicably coupled with, an application server, an email server, a web server, a caching server, a streaming data server, or a combination of servers.

The computer 1202 can receive requests over network 1230 from a client application (for example, executing on another computer 1202). The computer 1202 can respond to the received requests by processing the received requests using software applications. Requests can also be sent to the computer 1202 from internal users (for example, from a command console), external (or third) parties, automated applications, entities, individuals, systems, and computers.

Each of the components of the computer 1202 can communicate using a system bus 1203. In some implementations, any or all of the components of the computer 1202, including hardware or software components, can interface with each other or the interface 1204 (or a combination of both) over the system bus 1203. Interfaces can use an application programming interface (API) 1212, a service layer 1213, or a combination of the API 1212 and service layer 1213. The API 1212 can include specifications for routines, data structures, and object classes. The API 1212 can be either computer-language independent or dependent. The API 1212 can refer to a complete interface, a single function, or a set of APIs.

The service layer 1213 can provide software services to the computer 1202 and other components (whether illustrated or not) that are communicably coupled to the computer 1202. The functionality of the computer 1202 can be accessible for all service consumers using this service layer. Software services, such as those provided by the service layer 1213, can provide reusable, defined functionalities through a defined interface. For example, the interface can be software written in JAVA, C++, or a language providing data in extensible markup language (XML) format. While illustrated as an integrated component of the computer 1202, in alternative implementations, the API 1212 or the service layer 1213 can be stand-alone components in relation to other components of the computer 1202 and other components communicably coupled to the computer 1202. Moreover, any or all parts of the API 1212 or the service layer 1213 can be implemented as child or sub-modules of another software module, enterprise application, or hardware module without departing from the scope of the present disclosure.

The computer 1202 includes an interface 1204. Although illustrated as a single interface 1204 in FIG. 12, two or more interfaces 1204 can be used according to particular needs, desires, or particular implementations of the computer 1202 and the described functionality. The interface 1204 can be used by the computer 1202 for communicating with other systems that are connected to the network 1230 (whether illustrated or not) in a distributed environment. Generally, the interface 1204 can include, or be implemented using, logic encoded in software or hardware (or a combination of software and hardware) operable to communicate with the network 1230. More specifically, the interface 1204 can include software supporting one or more communication protocols associated with communications. As such, the network 1230 or the interface's hardware can be operable to communicate physical signals within and outside of the illustrated computer 1202.

The computer 1202 includes a processor 1205. Although illustrated as a single processor 1205 in FIG. 12, two or more processors 1205 can be used according to particular needs, desires, or particular implementations of the computer 1202 and the described functionality. Generally, the processor 1205 can execute instructions and can manipulate data to perform the operations of the computer 1202, including operations using algorithms, methods, functions, processes, flows, and procedures as described in the present disclosure.

The computer 1202 also includes a database 1206 that can hold data for the computer 1202 and other components connected to the network 1230 (whether illustrated or not). For example, database 1206 can be an in-memory, conventional, or a database storing data consistent with the present disclosure. In some implementations, database 1206 can be a combination of two or more different database types (for example, hybrid in-memory and conventional databases) according to particular needs, desires, or particular implementations of the computer 1202 and the described functionality. Although illustrated as a single database 1206 in FIG. 12, two or more databases (of the same, different, or combination of types) can be used according to particular needs, desires, or particular implementations of the computer 1202 and the described functionality. While database 1206 is illustrated as an internal component of the computer 1202, in alternative implementations, database 1206 can be external to the computer 1202.

The computer 1202 also includes a memory 1207 that can hold data for the computer 1202 or a combination of components connected to the network 1230 (whether illustrated or not). Memory 1207 can store any data consistent with the present disclosure. In some implementations, memory 1207 can be a combination of two or more different types of memory (for example, a combination of semiconductor and magnetic storage) according to particular needs, desires, or particular implementations of the computer 1202 and the described functionality. Although illustrated as a single memory 1207 in FIG. 12, two or more memories 1207 (of the same, different, or combination of types) can be used according to particular needs, desires, or particular implementations of the computer 1202 and the described functionality. While memory 1207 is illustrated as an internal component of the computer 1202, in alternative implementations, memory 1207 can be external to the computer 1202.

The application 1208 can be an algorithmic software engine providing functionality according to particular needs, desires, or particular implementations of the computer 1202 and the described functionality. For example, application 1208 can serve as one or more components, modules, or applications. Further, although illustrated as a single application 1208, the application 1208 can be implemented as multiple applications 1208 on the computer 1202. In addition, although illustrated as internal to the computer 1202, in alternative implementations, the application 1208 can be external to the computer 1202.

The computer 1202 can also include a power supply 1214. The power supply 1214 can include a rechargeable or non-rechargeable battery that can be configured to be either user- or non-user-replaceable. In some implementations, the power supply 1214 can include power-conversion and management circuits, including recharging, standby, and power management functionalities. In some implementations, the power supply 1214 can include a power plug to allow the computer 1202 to be plugged into a wall socket or a power source to, for example, power the computer 1202 or recharge a rechargeable battery.

There can be any number of computers 1202 associated with, or external to, a computer system containing computer 1202, with each computer 1202 communicating over network 1230. Further, the terms "client," "user," and other appropriate terminology can be used interchangeably, as appropriate, without departing from the scope of the present disclosure. Moreover, the present disclosure contemplates that many users can use one computer 1202 and one user can use multiple computers 1202.

Described implementations of the subject matter can include one or more features, alone or in combination.

For example, in a first implementation, a computer-implemented method includes the following. Variogram modeling is performed using a set of variogram models on a set of wells in parallel (major), normal (minor), and vertical directions for continuous log porosity to select a best-fit variogram model using large uncertainty ranges and a preferred-normal distribution of each variogram model in the set of variogram models. A distribution of geological properties of a subset of the set of wells is determined onto the best-fit variogram model. Multiple realizations are executed on the subset of wells to determine predicted porosities over the best-fit variogram model. Correlation coefficients of actual porosity versus predicted porosity are generated on the subset of wells using the multiple realizations. The performing, determining, executing and generating are repeated until a correlation meets a predetermined acceptance criteria. A variogram range for the best-fit variogram model is optimized using a high correlation realization. Correlations are determined for the subset of wells by executing multiple realizations using a same seed number and the optimized variogram range. Final optimized variogram ranges uncertainties are determined by repeating the optimizing and determining until an acceptance correlation is achieved.

The foregoing and other described implementations can each, optionally, include one or more of the following features:

A first feature, combinable with any of the following features, the method further including: selecting the set of wells by determining suitable wells on which to analyze variograms model.

A second feature, combinable with any of the previous or following features, where determining suitable wells includes selecting only vertical wells not having horizontal sections.

A third feature, combinable with any of the previous or following features, where the subset of the set of wells is a set of blind test wells.

A fourth feature, combinable with any of the previous or following features, the method further including: generating a scatterplot for display in a user interface, where the scatterplot includes points for the multiple realizations and points for the subset of the wells plotted relative to a parallel/major range and a normal/minor range.

A fifth feature, combinable with any of the previous or following features, the method further including: overlaying, onto the scatterplot, shaded ribbons identifying optimized uncertainty ranges of the parallel/major range and the normal/minor range.

A sixth feature, combinable with any of the previous or following features, the method further including: conducting tests and experiments using a series of design of experiments (DoE) scenarios per variogram range definition, including executing 2-level DoE to validate uncertainty envelopes and executing 3-level DoE to refine intra-envelope parameter uncertainty samplings.

In a second implementation, a non-transitory, computer-readable medium stores one or more instructions executable by a computer system to perform operations including the following. Variogram modeling is performed using a set of variogram models on a set of wells in parallel (major), normal (minor), and vertical directions for continuous log porosity to select a best-fit variogram model using large uncertainty ranges and a preferred-normal distribution of each variogram model in the set of variogram models. A distribution of geological properties of a subset of the set of wells is determined onto the best-fit variogram model. Multiple realizations are executed on the subset of wells to determine predicted porosities over the best-fit variogram model. Correlation coefficients of actual porosity versus predicted porosity are generated on the subset of wells using the multiple realizations. The performing, determining, executing and generating are repeated until a correlation meets a predetermined acceptance criteria. A variogram range for the best-fit variogram model is optimized using a high correlation realization. Correlations are determined for the subset of wells by executing multiple realizations using a same seed number and the optimized variogram range. Final optimized variogram ranges uncertainties are determined by repeating the optimizing and determining until an acceptance correlation is achieved.

The foregoing and other described implementations can each, optionally, include one or more of the following features:

A first feature, combinable with any of the following features, the operations further including: selecting the set of wells by determining suitable wells on which to analyze variograms model.

A second feature, combinable with any of the previous or following features, where determining suitable wells includes selecting only vertical wells not having horizontal sections.

A third feature, combinable with any of the previous or following features, where the subset of the set of wells is a set of blind test wells.

A fourth feature, combinable with any of the previous or following features, the operations further including: generating a scatterplot for display in a user interface, where the scatterplot includes points for the multiple realizations and points for the subset of the wells plotted relative to a parallel/major range and a normal/minor range.

A fifth feature, combinable with any of the previous or following features, the operations further including: overlaying, onto the scatterplot, shaded ribbons identifying optimized uncertainty ranges of the parallel/major range and the normal/minor range.

A sixth feature, combinable with any of the previous or following features, the operations further including: conducting tests and experiments using a series of design of experiments (DoE) scenarios per variogram range definition, including executing 2-level DoE to validate uncertainty envelopes and executing 3-level DoE to refine intra-envelope parameter uncertainty samplings.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Variogram modeling is performed using a set of variogram models on a set of wells in parallel (major), normal (minor), and vertical directions for continuous log porosity to select a best-fit variogram model using large uncertainty ranges and a preferred-normal distribution of each variogram model in the set of variogram models. A distribution of geological properties of a subset of the set of wells is determined onto the best-fit variogram model. Multiple realizations are executed on the subset of wells to determine predicted porosities over the best-fit variogram model. Correlation coefficients of actual porosity versus predicted porosity are generated on the subset of wells using the multiple realizations. The performing, determining, executing and generating are repeated until a correlation meets a predetermined acceptance criteria. A variogram range for the best-fit variogram model is optimized using a high correlation realization. Correlations are determined for the subset of wells by executing multiple realizations using a same seed number and the optimized variogram range. Final optimized variogram ranges uncertainties are determined by repeating the optimizing and determining until an acceptance correlation is achieved.

The foregoing and other described implementations can each, optionally, include one or more of the following features:

A first feature, combinable with any of the following features, the operations further including: selecting the set of wells by determining suitable wells on which to analyze variograms model.

A second feature, combinable with any of the previous or following features, where determining suitable wells includes selecting only vertical wells not having horizontal sections.

A third feature, combinable with any of the previous or following features, where the subset of the set of wells is a set of blind test wells.

A fourth feature, combinable with any of the previous or following features, the operations further including: generating a scatterplot for display in a user interface, where the scatterplot includes points for the multiple realizations and points for the subset of the wells plotted relative to a parallel/major range and a normal/minor range.

A fifth feature, combinable with any of the previous or following features, the operations further including: overlaying, onto the scatterplot, shaded ribbons identifying optimized uncertainty ranges of the parallel/major range and the normal/minor range.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
- defining a three-dimensional volume of a subterranean zone using well log data;
- selecting from a set of variogram models comprising a plurality of variogram model types, a variogram model fitting a set of wells in parallel direction, normal direction, and vertical direction within the three-dimensional volume of the subterranean zone for continuous log porosity;
- estimating, using the variogram model, a distribution of geological properties of a subset of wells of the set of wells at unsampled locations;
- determining, by using the variogram model, for the subset of wells, predicted porosities;
- determining correlations between actual porosities and predicted porosities for the subset of wells;
- determining, by using the correlations for the subset of wells, an optimized variogram range; and
- adjusting, by using a drilling control system and the optimized variogram range, drilling parameters within the three-dimensional volume of the subterranean zone, wherein the drilling parameters comprise drilling speed and direction.

2. The computer-implemented method of claim 1, further comprising:
- selecting a number of a type of wells to form the subset of wells.

3. The computer-implemented method of claim 2, wherein determining the subset of wells comprises selecting only vertical wells excluding horizontal sections.

4. The computer-implemented method of claim 1, wherein the subset of wells is a set of blind test wells.

5. The computer-implemented method of claim 1, further comprising:
- generating a scatterplot for display in a user interface, wherein the scatterplot comprises realization points and points for the subset of the wells plotted relative to the parallel direction and the normal direction.

6. The computer-implemented method of claim 5, further comprising:
- overlaying, onto the scatterplot, shaded ribbons identifying optimized uncertainty ranges of the parallel direction and the normal direction.

7. The computer-implemented method of claim 1, further comprising:
- conducting tests and experiments using a series of design of experiments (DoE) scenarios per variogram range definition, including executing 2-level DoE to validate uncertainty envelopes and executing 3-level DoE to refine intra-envelope parameter uncertainty samplings.

8. A non-transitory, computer-readable medium storing one or more instructions executable by a computer system to perform operations comprising:
- defining a three-dimensional volume of a subterranean zone using well log data;
- selecting from a set of variogram models comprising a plurality of variogram model types, a variogram model fitting a set of wells in parallel direction, normal direction, and vertical direction within the three-dimensional volume of the subterranean zone for continuous log porosity;
- estimating, using the variogram model, a distribution of geological properties of a subset of wells of the set of wells at unsampled locations;
- determining, by using the variogram model, for the subset of wells, predicted porosities;
- determining correlations between actual porosities and predicted porosities for the subset of wells;
- determining, by using the correlations for the subset of wells, an optimized variogram range; and
- adjusting, by using a drilling control system and the optimized variogram range, drilling parameters within the three-dimensional volume of the subterranean zone, wherein the drilling parameters comprise drilling speed and direction.

9. The non-transitory, computer-readable medium of claim 8, the operations further comprising:
- selecting a number of a type of wells to form the subset of wells.

10. The non-transitory, computer-readable medium of claim 9, wherein determining the subset of wells comprises selecting only vertical wells excluding horizontal sections.

11. The non-transitory, computer-readable medium of claim 8, wherein the subset of wells is a set of blind test wells.

12. The non-transitory, computer-readable medium of claim 8, the operations further comprising:
- generating a scatterplot for display in a user interface, wherein the scatterplot comprises realization points and points for the subset of the wells plotted relative to the parallel direction and the normal direction.

13. The non-transitory, computer-readable medium of claim 12, the operations further comprising:
- overlaying, onto the scatterplot, shaded ribbons identifying optimized uncertainty ranges of the parallel direction and the normal direction.

14. The non-transitory, computer-readable medium of claim 8, the operations further comprising:
- conducting tests and experiments using a series of design of experiments (DoE) scenarios per variogram range definition, including executing 2-level DoE to validate uncertainty envelopes and executing 3-level DoE to refine intra-envelope parameter uncertainty samplings.

15. A computer-implemented system, comprising:
- one or more processors; and
- a non-transitory computer-readable storage medium coupled to the one or more processors and storing programming instructions for execution by the one or more processors, the programming instructions instructing the one or more processors to perform operations comprising:
  - defining a three-dimensional volume of a subterranean zone using well log data;
  - selecting from a set of variogram models comprising a plurality of variogram model types, a variogram model fitting a set of wells in parallel direction, normal direction, and vertical direction within the three-dimensional volume of the subterranean zone for continuous log porosity;

estimating, using the variogram model, a distribution of geological properties of a subset of wells of the set of wells at unsampled locations;

determining, by using the variogram model, for the subset of wells, predicted porosities;

determining correlations between actual porosities and predicted porosities for the subset of wells;

determining, by using the correlations for the subset of wells, an optimized variogram range; and adjusting, by using a drilling control system and the optimized variogram range, drilling parameters within the three-dimensional volume of the subterranean zone, wherein the drilling parameters comprise drilling speed and direction.

16. The computer-implemented system of claim 15, the operations further comprising:

selecting a number of a type of wells to form the subset of wells.

17. The computer-implemented system of claim 16, wherein determining the subset of wells comprises selecting only vertical wells excluding horizontal sections.

18. The computer-implemented system of claim 15, wherein the subset of wells is a set of blind test wells.

19. The computer-implemented system of claim 15, the operations further comprising:

generating a scatterplot for display in a user interface, wherein the scatterplot comprises realization points and points for the subset of the wells plotted relative to the parallel direction and the normal direction.

20. The computer-implemented system of claim 19, the operations further comprising:

overlaying, onto the scatterplot, shaded ribbons identifying optimized uncertainty ranges of the parallel direction and the normal direction.

* * * * *